US009942214B1

(12) United States Patent
Burciu et al.

(10) Patent No.: US 9,942,214 B1
(45) Date of Patent: Apr. 10, 2018

(54) AUTOMATED AGENT DETECTION UTILIZING NON-CAPTCHA METHODS

(71) Applicant: Amazon Technologies, Inc., Seattle, WA (US)

(72) Inventors: Alexandru Burciu, Suceava (RO); Blair Livingstone Hotchkies, Bellevue, WA (US); Valeriu Palos, Bucharest (RO); Gabriel-Valeriu Rizuc, Pascani (RO); Sorin Alin Stoiana, Craiova (RO); Elena Zlavog, Iasi (RO)

(73) Assignee: Amazon Technologies, Inc., Seattle, WA (US)

( * ) Notice: Subject to any disclaimer, the term of this patent is extended or adjusted under 35 U.S.C. 154(b) by 50 days.

(21) Appl. No.: 14/636,069

(22) Filed: Mar. 2, 2015

(51) Int. Cl.
    H04L 29/06   (2006.01)
    G06F 21/00   (2013.01)
    G06F 21/36   (2013.01)
    H04L 12/26   (2006.01)

(52) U.S. Cl.
    CPC ............. H04L 63/08 (2013.01); H04L 63/10 (2013.01); H04L 63/1441 (2013.01); H04L 63/168 (2013.01)

(58) Field of Classification Search
    CPC ....... H04L 63/08; H04L 63/10; H04L 63/168; H04L 63/1441
    See application file for complete search history.

(56) References Cited

U.S. PATENT DOCUMENTS

| 8,914,878 | B2 * | 12/2014 | Burns ................. H04L 63/1441 726/13 |
| 9,361,446 | B1 * | 6/2016 | Demirjian ............... G06F 21/36 |
| 2010/0302255 | A1 * | 12/2010 | Brown .................. G06T 1/0021 345/473 |

(Continued)

FOREIGN PATENT DOCUMENTS

EP            2247064 A2 *  11/2010    ......... H04L 63/1441

OTHER PUBLICATIONS

Sajad Shirali-Shahreza, Gerald Penn, Ravin Balakrishnan, Yashar Ganjali; "SeeSay and HearSay CAPTCHA for mobile interaction"; Apr. 2013; CHI '13: Proceedings of the SIGCHI Conference on Human Factors in Computing Systems Publisher: ACM; pp. 2147-2156.*

(Continued)

*Primary Examiner* — Kambiz Zand
*Assistant Examiner* — Courtney Fields
(74) *Attorney, Agent, or Firm* — Davis Wright Tremaine LLP

(57) ABSTRACT

A computer-facilitated service receives a request, from a user client, to access a site provided by the service. The service may obtain, from the request, identifying information, which may be used to identify prior activity of the user client. This prior activity is used to determine whether the user client is to be provided with an interstitial user interface component, which may be configured to cause the user client to provide additional information about the client and to be successfully completable by an automated agent or other (Continued)

automated process. If an interstitial user interface component is provided, the service may receive, from the user client, this additional information, which may be used to determine whether the user client is using an automated agent to access the site.

20 Claims, 11 Drawing Sheets

(56) References Cited

U.S. PATENT DOCUMENTS

| | | | | |
|---|---|---|---|---|
| 2011/0219419 A1* | 9/2011 | Reisman | ........... | G06F 17/30873 |
| | | | | 725/112 |
| 2012/0166294 A1* | 6/2012 | Lieberman | ......... | G06Q 30/0276 |
| | | | | 705/14.72 |
| 2014/0331119 A1* | 11/2014 | Dixon | ................... | H04L 63/168 |
| | | | | 715/234 |

OTHER PUBLICATIONS

Brown, N.H., "Managing System Load," in U.S. Appl. No. 13/766,350, filed Feb. 13, 2013.

* cited by examiner

AUTOMATED AGENT DETECTION UTILIZING NON-CAPTCHA METHODS

BACKGROUND

Computer-facilitated service providers and other providers often enable users, through various user clients, to access a variety of computer-facilitated services to obtain information, complete transactions and otherwise interact with these computer-facilitated services. These computer-facilitated services, while primarily utilized by legitimate customers and other users of these services, may also receive various requests from automated agents or other automated processes. Some users may utilize these automated agents or automated processes to gather sensitive information, sabotage online polling, and obtain information about other users. To prevent such incursions by these automated agents or other automated processes, computer-facilitated service providers may implement a variety of Completely Automated Public Turing test to tell Computers and Humans Apart (CAPTCHA) challenges to distinguish a legitimate user from an automated agent or automated process. However, these CAPTCHA challenges do not allow these computer-facilitated service providers to gather information regarding these automated agents and other automated processes to curb further access to these computer-facilitated services. Additionally, these CAPTCHA challenges may also prevent legitimate users from accessing these computer-facilitated services, as CAPTCHA challenges may be difficult for some users to complete.

BRIEF DESCRIPTION OF THE DRAWINGS

Various embodiments in accordance with the present disclosure will be described with reference to the drawings, in which:

FIG. 4 shows an illustrative example of a client interface in which a user is required to provide payment information in order to obtain additional information as a result of suspicion that the user may be an automated agent in accordance with at least one embodiment;

FIG. 5 shows an illustrative example of a client interface in which a user is required to determine whether he/she would like to receive a newsletter from the service as a result of suspicion that the user may be an automated agent in accordance with at least one embodiment;

DETAILED DESCRIPTION

Figure 1:
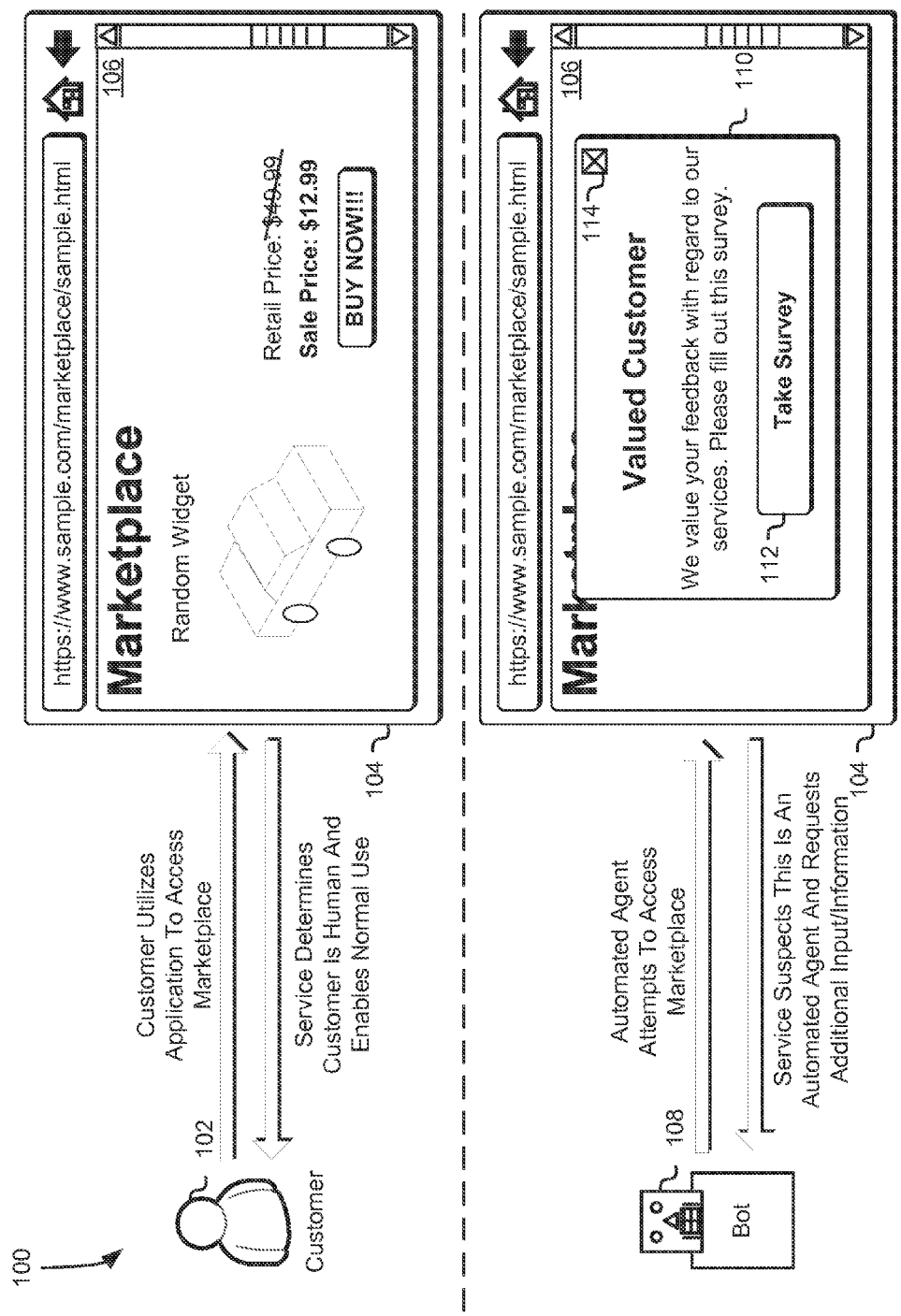
FIG. 1 shows an illustrative example of an environment in which various embodiments can be implemented.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to the use of non-CAPTCHA methods to evaluate user client activity and interaction with computer-facilitated services to determine whether the user client activity is consistent with that of an automated agent or other automated process. In an embodiment, a computer-facilitated service receives, through an interface, a request from a user client to access a particular site or other data repository. This request may include identifying information (e.g., an Internet Protocol (IP) address of the user client, user name, cookies, etc.) that may be useful in determining a set of characteristics of the particular user client. For instance, the computer-facilitated service may utilize this received identifying information to identify any past activity performed by the user client and, based on this past activity, calculate an automated agent score, which may denote a level of suspicion that the user client is actually a bot or other automated process. Additionally, the information included within the request may be utilized as input in the calculation of the automated agent score. For instance, if the computer-facilitated service determines that a significant number of requests emanate from a particular IP address and these requests occur with great frequency, the computer-facilitated service may suspect that this particular user client may be part of a botnet. It should be noted that automated agents may be colloquially called "bots" or "robots" and are distinguishable from client applications configured to auto-fill entry fields with customer information by way of being able to navigate through a site or other collection of user interface pages in an automated fashion.

The computer-facilitated service may utilize the automated agent score to determine whether the particular user client is suspected to be an automated agent or other automated process. If the automated agent score is sufficiently low enough that the user client is not suspected to be an automated agent or other automated process, the computer-facilitated service may enable the user client to access the site or other data repository. Further, the computer-facilitated service may record any activity performed by the user client within the site or other data repository to provide additional input for the calculation of future automated agent scores for other user clients. However, if the computer-facilitated service, based on the calculated automated agent score, suspects that the user client is an automated agent or other automated process, the computer-facilitated service may generate an interstitial user interface component within the site or data repository, which may require additional input to be provided before access to the site or data repository is granted. For instance, the computer-facilitated service may prompt the user client to provide payment information, provide user account information or credentials, complete a customer survey, determine whether to access a charitable giving site, and the like before the user client can access the requested site or data repository.

In an embodiment, as the user client interacts with this newly provided interstitial user interface component, the computer-facilitated service records these interactions to determine whether the user client is an automated agent or other automated process. For instance, the computer-facilitated service may record any cursor movements, button presses, keyboard key presses, and any modification of the programming code of the interstitial user interface component. Additionally, the computer-facilitated service may further record any information provided by the user client through use of the interstitial user interface component, such as names, addresses, payment information, and the like. Based on these interactions and information provided by the user client through the interstitial user interface component, the computer-facilitated service may calculate a new automated agent score for the particular user client to determine whether the user client is to no longer be suspected of being an automated agent or automated process, the user client is still suspected to be an automated agent or automated process, or, as a result of the automated agent score exceeding a particular threshold value, the user client is an automated agent or automated process. If the user client, based on the calculated score exceeding the particular threshold value, is determined to be an automated agent or automated process, the computer-facilitated service may deny the user client request to access the site or data repository. However, if the user client is still suspected to be an automated agent, the computer-facilitated service may utilize decision logic or other algorithms to determine what interstitial user interface component is to be provided to the user client in order to obtain additional information.

In this manner, a computer-facilitated service may determine whether a user client is an automated agent or other automated process while obtaining additional information that can be used in the future to enhance site security, prevent further automated agent incursions, forensic use and to train automated agent detection algorithms. Additionally, the techniques described and suggested herein facilitate additional technical advantages. For example, because, in some embodiments, the computer-facilitated service is configured to provide an interstitial user interface component in the event that a user client is suspected of being an automated agent or automated process, users may be able to provide information or interact with the interstitial user interface component in a manner that, for a user, may be intuitive and simple. This may enable users that have difficulty in completing CAPTCHA challenges to provide other information in order to access the requested site or data repository.

FIG. 1 shows an illustrative example of an environment 100 in which various embodiments can be implemented. In the environment 100, a customer 102 may utilize a user client 104 to request access a particular site 106. The site 106 may be maintained by a computer-facilitated service, which may enable the customer 102 to access certain data, purchase items from an online marketplace, access an e-mail account, and the like. When the customer 102 utilizes the user client 104 to request access to the particular site 106, the computer-facilitated service may receive the request and obtain information necessary to determine whether the customer 102 may be granted access to the site 106. For instance, in an embodiment, the computer-facilitated service determines, from the request, identifying information for the customer 102. The identifying information may include a set of user credentials for the customer 102, IP address for the customer 102, one or more cookies, and the like. This identifying information may be used to determine the customer's 102 past activities as related to the particular site 106 or other sites and resources provided by the computer-facilitated service.

Based at least in part on the information provided by the customer 102 through the request and the customer's 102 past activity, the computer-facilitated service may calculate a automated agent score, which may be used to determine whether there is reasonable suspicion that the customer 102 is an automated agent 108 or other automated process. For instance, if the IP address for the customer 102 has been determined to be a safe IP address (e.g., not associated with a rogue nation, has not flagged as a suspicious IP address, has not been utilized in a suspicious manner by various user clients, etc.), and the customer's 102 past activities have been deemed legitimate, the computer-facilitated service may enable the customer 102 to utilize the user client 104 to access the requested site 106. However, should the calculated automated agent score result in suspicion that the customer 102 may be an automated agent 108 or other automated process, the computer-facilitated service may determine what action is to be taken to obtain more information that can be used to determine, with greater certainty, whether the customer 102 is in fact an automated agent 108 or other automated process.

If the customer 102 is suspected of being an automated agent 108 or other automated process, the computer-facilitated service may generate an interstitial user interface component 110, which may require additional customer 102 inputs before he/she may access the totality of the site 106. For instance, as illustrated in FIG. 1, the computer-facilitated service may generate an interstitial user interface component 110, which may prompt the customer 102 to select a button 112 to take a survey or select a closure button 114 to terminate the interstitial user interface component 110 and proceed to the site 106 as requested. As the customer 102 interacts with the interstitial user interface component 110, the computer-facilitated service may record the customer's 102 interactions with the interstitial user interface component 110. For instance, the computer-facilitated service may track the customer's 102 button presses, key presses, cursor movement on the user client 104, and other inputs. These inputs may be recorded within an activity log, which may include the various inputs by customers, automated agents and other automated processes.

The interstitial user interface component 110 may be configured such that the interstitial user interface component 110 may be successfully completable by the automated agent 108. For instance, an automated agent 108 may determine a proper response to information requested in the interstitial user interface component 110 by parsing text, without performing image, audio, or video processing, and applying a set of rules to the parsed text. The automated agent 108 or automated process may obtain the requested information from a database or other information repository accessible by the automated agent 108 or automated process.

Based at least in part on the customer's 102 interaction with the interstitial user interface component 110, the computer-facilitated service may calculate a new automated agent score for the customer 102 and determine whether the customer 102 may access the site 106, should be presented with another interstitial user interface component 110 to obtain additional information, or be prevented from accessing the site 106. For instance, if the computer-facilitated service determines, based at least in part on the re-calculated automated agent score, that the customer 102 is a valid user (e.g., a human), the computer-facilitated service may enable the customer 102 to utilize his/her user client 104 to access the site 106 as requested. If the re-calculated automated agent score still results in a suspicion that the customer 102 may be an automated agent 108 or other automated process, the computer-facilitated service may select a more restrictive interstitial user interface component 110, which the customer 102 may be required to complete to access the site 106. This more restrictive interstitial user interface component 110 may require the customer 102 to provide additional information (e.g., payment information, physical address, user credentials, etc.) and prevent the customer 102 from terminating the interstitial user interface component 110 without providing such information.

If the computer-facilitated service determines that the re-calculated automated agent score exceeds a maximum threshold, the computer-facilitated service may conclude that an automated agent 108 is attempting to access the site 106. Under such circumstances, the computer-facilitated service may present the automated agent 108 with a blocking interstitial user interface component 110, which may prevent any access to the site 106 until one or more actions are undertaken to remove the restrictions in place to prevent automated agent 108 access to the site 106. For instance, if the computer-facilitated service determines that the customer 102 is utilizing an automated agent 108 or other automated process to access the site 106, the customer 102 may be required to contact an administrator or help line associated with the computer-facilitated service to determine what remedial actions are to be taken by the customer 102 in order to be granted access to the site 106 through use of the user client 104. The blocking interstitial user interface component 110 may be configured to prevent the customer 102 or automated agent 108 from bypassing the interstitial user interface component 110 to access the site 106 and may instead include one or more buttons that, when selected, may terminate the connection between the user client 104 and the site 106. This may prevent the customer 102 or automated agent 108 from obtaining any information from the site 106 until remedial actions are performed to restore access to the site 106.

In an embodiment, the computer-facilitated service utilizes decision tree logic to determine what course of action is to be taken based at least in part on information included within the request to access the site 106 and any subsequent information provided by the customer 102 in response to an interstitial user interface component 110 presented to the customer 102. For instance, if, based at least in part on the IP address of the customer 102, the computer-facilitated service determines that the IP address has not previously been observed by the computer-facilitated service, the computer-facilitated service may determine the geographical location of the customer 102 based at least in part on the provided IP address. If this geographical location is determined to be safe (e.g., trusted location, etc.), the computer-facilitated service may generate a simple interstitial user interface component 110 by which a customer 102 may terminate the interstitial user interface component 110 through use of the closure button 114 or complete one or more actions specified by the computer-facilitated service. For example, as illustrated in FIG. 1, a customer 102 may be prompted to complete a survey if he/she is willing to do so. Upon completion of the survey or if the customer 102 opts to use the closure button 114 to terminate the interstitial user interface component 110, the customer 102 may proceed to access the site 106. The computer-facilitated service may record any interaction between the customer 102 and the interstitial user interface component 110 for future reference and in refining the calculations performed to compute the automated agent score for the users of the site 106.

The decision tree logic may cause the computer-facilitated service to undertake more restrictive actions based at least in part on other information garnered through customer 102 interaction with an interstitial user interface component 110. For instance, if the IP address of the customer 102 is determined to be suspect (e.g., an inordinate number of requests emanate from the particular IP address, suspicious activity has been performed by users reporting the IP address, etc.), the computer-facilitated service may require the customer 102, through an interstitial user interface component 110, to provide a physical address where the customer 102 may be located. If the provided physical address is suspect (e.g., an inordinate number of users are utilizing the same address to access the site 106, the address is fictional, etc.) or the customer 102 has failed to provide a physical address, the computer-facilitated service may generate a blocking interstitial user interface component 110, which may prevent the customer 102 from accessing the site 106 until he/she contacts an administrator of the site 106 or a particular help line associated with the computer-facilitated service to obtain instructions for restoring access to the site 106. In this manner, the decision tree logic enables the computer-facilitated service to determine a course of action based at least in part on information provided by the customer 102 and any historical data for the customer 102 and other users of the computer-facilitated service.

Generally, a probability distribution may be used to determine how to proceed in a decision tree. For instance, an input into a node of a decision tree may be one of N classifications (where N is a positive integer representing a number of paths that can be taken from the node). An input may be classified in one of N ways and, for each of the N ways, there may be a corresponding probability distribution that is used to select a path. The path may be selected probabilistically (e.g., according to a Monte Carlo method) in accordance with how the input is classified. As an illustrative example, a geographic location mapped to an IP address can be classified as suspect, neutral, or non-suspect, in some embodiments. There may be three paths that may be taken from a node in a decision tree that corresponds to the geographic location mapped to the IP address. If the IP address is classified as suspect, a stochastic selection algorithm may be used such that there is a P1 probability of going down a first path, a P2 probability of going down a second path, and a P3 probability of going down a third path, where the sum of P1, P2, and P3 is equal to one. If the IP address is classified as unknown, a stochastic selection process may be used to select a path from the three paths, where a different set of probabilities are assigned to the three paths than were assigned for the suspect classification. Similarly, if the IP address is classified as safe, a stochastic selection process may be used to select a path from the three paths, where a third set of probabilities are assigned to the three paths, distinct from those assigned for the suspect and unknown classifications. As an example selection process, each possible path from a node may be assigned an interval between zero and one, where the length of the intervals sum to one and each length corresponds to a probability of being selected (e.g., an interval with length 0.5 would have a 50% chance of being selected). A random number generator (e.g., a pseudo-random number generator) may be used to generate a number and the interval in which the number lies may be used to determine which path to take. Other ways of stochastically selecting paths may also be used.

As an illustrative example, if the IP address of the customer 102 is classified as suspect, a greater probability may be assigned to a first path, wherein the path may lead to the computer-facilitated service providing an interstitial user interface component to determine the customer's 102 physical address. A second path, assigned a lower probability than the first path, if followed may cause the computer-facilitated service to determine, based at least in part on the provided IP address, the geographical location mapped to the IP address. Finally, the lowest probability may be assigned to a third path, which, when followed, may enable the customer 102 to access the site 106 without restriction. Subsequently the computer-facilitated service may utilize a random number generator to generate a number to determine which of the three paths the computer-facilitated service will take. Regardless of which path is taken, the computer-facilitated service may record any activity of the customer 102 as he/she utilizes the site 106 to further enhance the decision tree logic, calculation algorithm for the automated agent score, or the probability distributions.

Figure 2:
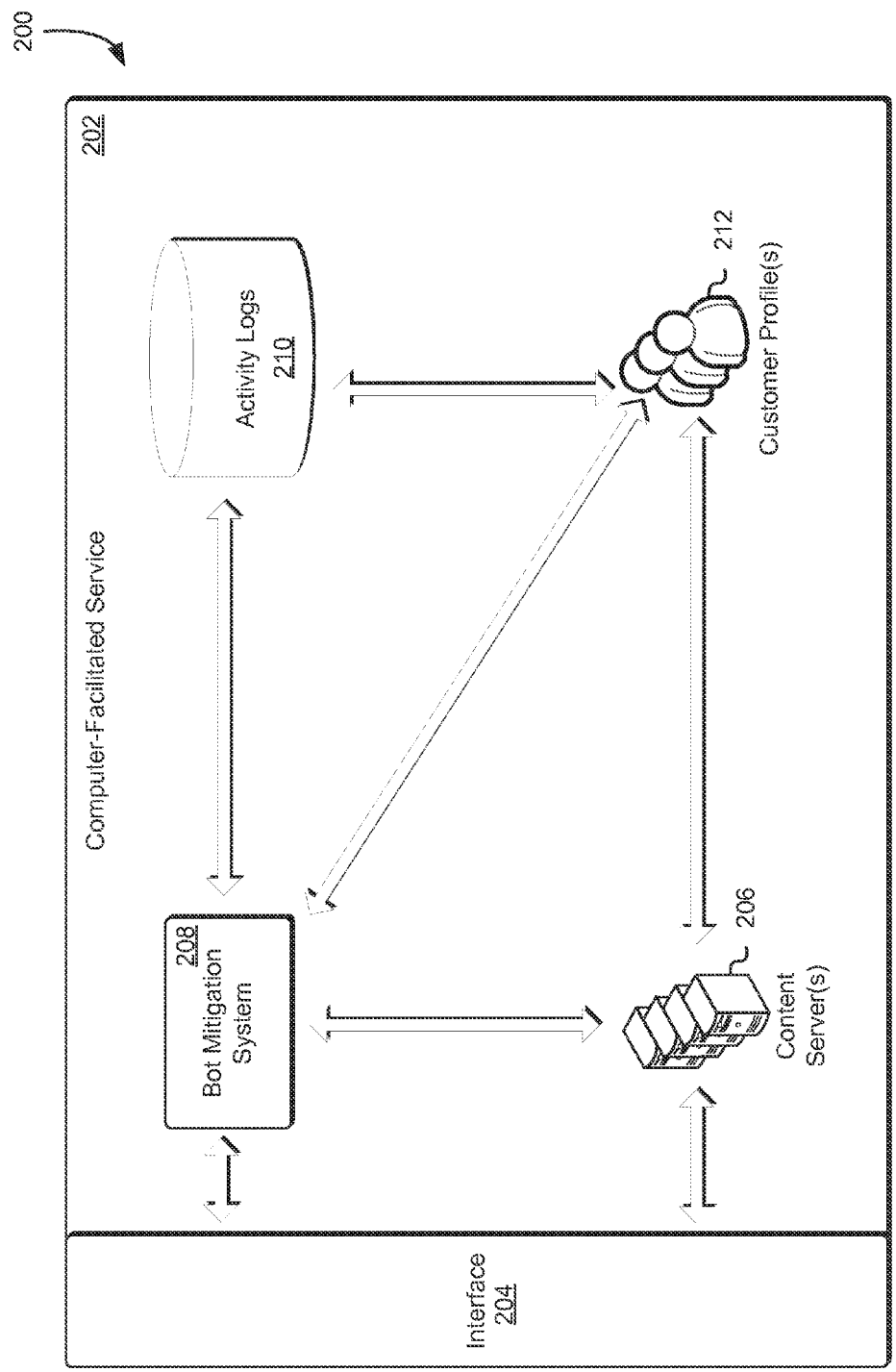
FIG. 2 shows an illustrative example of an environment in which various components of a service are collectively configured to detect automated agent activity and perform one or more actions to mitigate such activity in accordance with at least one embodiment.

As noted above, the computer-facilitated service may determine, based at least in part on information included within a customer request to access a particular site, as well as the customer's past activity and activity logs for a plurality of users, whether the customer is suspected of utilizing an automated agent or other automated process. If so, the computer-facilitated service may generate an interstitial user interface component, which the customer may be required to interact with in order to access the particular site. Alternatively, the interstitial user interface component may prevent the customer from accessing the site until he/she contacts an administrator of the site or a help line provided by the computer-facilitated service to determine what remedial actions need to be performed by the customer to restore access to the site. Accordingly, FIG. 2 shows an illustrative example of an environment 200 in which various components of a computer-facilitated service 202 are collectively configured to detect automated agent activity and perform one or more actions to mitigate such activity in accordance with at least one embodiment.

In the environment 200, the computer-facilitated service 202 may provide an interface 204, which may include one or more sites that may be accessed by various customers and other users of the computer-facilitated service 202 through one or more user clients (e.g., web browser applications, etc.). For example, each site may have an associated uniform resource locator (URL), which the customer may enter into the user client to request access to a particular site provided by the computer-facilitated service 202. The user client, based at least in part on the URL provided by the customer, may transmit a request to the computer-facilitated service 202 to access the site specified by the customer. The request may be received by a bot mitigation system 208, which may be configured to parse the request to determine information about the customer and the user client that can be used to determine whether to suspect the presence of an automated agent or other automated process. For instance, through the request, the bot mitigation system 208 may determine the identifying information of the customer requesting access to a particular site and, in some instances, a set of customer credentials that may be required to access a secure site. If the request includes a set of customer credentials, the bot mitigation system 208 may access a customer profile repository 212 to identify past customer activity which may be used as part of the determination whether to suspect the presence of an automated agent or other automated process.

The customer profile repository 212 may include one or more customer profiles for a plurality of customers of the computer-facilitated service 202. Each customer profile may include certain information about the corresponding customer, such as the customer's physical address, last known IP address, previously visited sites and the like. Additionally, each customer profile may include an activity log detailing the customer's prior actions related to the sites provided by the computer-facilitated service 202. This customer activity log may be updated periodically or in response to a triggering event (e.g., different IP address recorded, etc.) through use of one or more activity logs stored within an activity log repository 210. This activity log repository 210 may record any activity pertaining to any site provided by the computer-facilitated service 202. The activity may be categorized based at least in part on the customer IP address, the set of credentials utilized by the customer to access the computer-facilitated service 202 and the like. Based at least in part on these categories, the customer profile repository 212 may be able to obtain the relevant activity logs necessary to update each customer profile.

In addition to obtaining information from a customer profile, the bot mitigation system 208 may access the activity log repository 210 to identify any trends (e.g., unusual activity during a certain time interval, similar IP addresses detected over a short period of time, etc.) that may be used to identify potential automated agents or the presence of other automated processes. Based at least in part on these identified trends, the customer profile and the information obtained from the customer request to access a particular site, the bot mitigation system 208 may calculate a automated agent score, which may be used to determine whether the customer may be suspected of utilizing an automated agent or other automated process to access the computer-facilitated service 202. If the customer, based at least in part on the calculated automated agent score, is not suspected of utilizing an automated agent or other automated process to access the computer-facilitated service 202, the bot mitigation service 208 may transmit a notification to one or more content servers 206 to generate the content to be displayed on the requested site. Thus, the customer may be granted access to the site and may utilize the site without any restriction.

If the bot mitigation system 208, based at least in part on the calculated automated agent score, suspects that the customer is utilizing an automated agent or other automated process to access one or more sites provided by the computer-facilitated service 202, the bot mitigation system 208 may transmit a request to the one or more content servers 206 to generate an interstitial user interface component that is to be provided to the customer as part of the requested site or in lieu of the site altogether. For instance, the bot mitigation system 208 may cause the one or more content servers 206 to generate an interstitial user interface component that may prompt the customer to provide payment information or terminate the interstitial user interface component before being able to access the site. The computer-facilitated service 202, through this interstitial user interface component, may record the customer's interactions with the interstitial user interface component within the activity log repository 210 and cause the customer profile within the customer profile repository 212 to be updated as well. The bot mitigation system 208 may utilize this newly obtained information to recalculate a automated agent score for the customer and determine whether the customer may access the requested site, should be presented with an additional interstitial user interface component to obtain additional information, or should be prevented from accessing the site altogether. For example, if the recalculated automated agent score exceeds a maximum threshold, the bot mitigation system 208 may determine that there is a high probability that the customer is utilizing an automated agent or other automated process to access a site provided by the computer-facilitated service 202. As a result, the bot mitigation system 208 may update the customer's profile to specify that he/she is not permitted to access the requested site. Further, the bot mitigation system 208 may cause the one or more content servers 206 to generate a blocking interstitial user interface component, which may prompt the customer to contact an administrator of the site or a help line provided by the computer-facilitated service 202 to obtain a set of instructions to perform one or more remedial actions and restore access to the requested site. The blocking interstitial user interface component may be configured to prevent the customer from bypassing this interstitial user interface component to access the site or any other resources provided by the computer-facilitated service 202.

In an embodiment, the bot mitigation system 208 obtains various activity logs from the activity log repository 210 to identify any potential trends that may signal automated agent usage. For instance, if a significant number of requests over a short period of time emanate from a single IP address or a small range of IP addresses, the bot mitigation system 208 may tag these IP addresses as being suspect. Additionally, the bot mitigation system 208 may evaluate all information provided by customers through the various interstitial user interface components to identify any trends that may signal automated agent usage. For example, if, through an interstitial user interface component, an unusual number of customers provide the same payment information or a physical address, this information may further be tagged as suspect. The presence of any of this suspect information may result in an increase in the automated agent score and a greater likelihood that the customer may be suspected of utilizing an automated agent or other automated process to access a site provided by the computer-facilitated service 202.

In some embodiments, the bot mitigation system 208, upon receiving a request from a user client to access a particular site, may utilize decision tree logic to determine what course of action is to be taken in response to the request. For instance, if, based at least in part on the IP address of the customer, the bot mitigation system 208 determines that the IP address has not previously been observed, the bot mitigation system 208 may follow a path from the IP address node that corresponds to an unknown IP address and reach a second node, which may cause the bot mitigation system 208 to determine the geographical location mapped to the IP address. If this geographical location is determined to be safe, the bot mitigation system 208 may follow a particular path along the decision tree until it reaches a termination node, which may cause the bot mitigation system 208 to transmit a request to the one or more content servers 206 to generate a simple interstitial user interface component that is to be presented to the customer. For example, as illustrated in FIG. 1, a customer may be prompted to complete a survey if he/she is willing to do so. Upon completion of the survey or termination of the interstitial user interface component, the bot mitigation system 208 may enable the one or more content servers 206 to provide the site to the customer. The computer-facilitated service 202 may record any interaction between the customer and the interstitial user interface component within the activity log repository 210. Alternatively, the bot mitigation system 208 may use a probability distribution to determine how to proceed in the decision tree, as described above in connection with FIG. 1.

It should be noted that in some embodiments the bot mitigation system 208 may be offered as a stand-alone service distinct from the computer-facilitated service 202. For instance, the bot mitigation service may provide its customers and other services with a database or other algorithm that may be utilized to determine whether there is a suspicion that an automated agent is being used to access the service. Thus, the service determines that there is suspicion of automated agent usage, the service may transmit any collected information to the bot mitigation service, which may utilize the information to calculate an automated agent score or utilize decision tree logic. Based at least in part on the obtained score or the decision tree logic, the bot mitigation service may determine if an interstitial user interface component is required. If so, the bot mitigation service may provide elements of this component to the other service or customer, which may utilize these elements to construct the interstitial user interface component.

Figure 3:
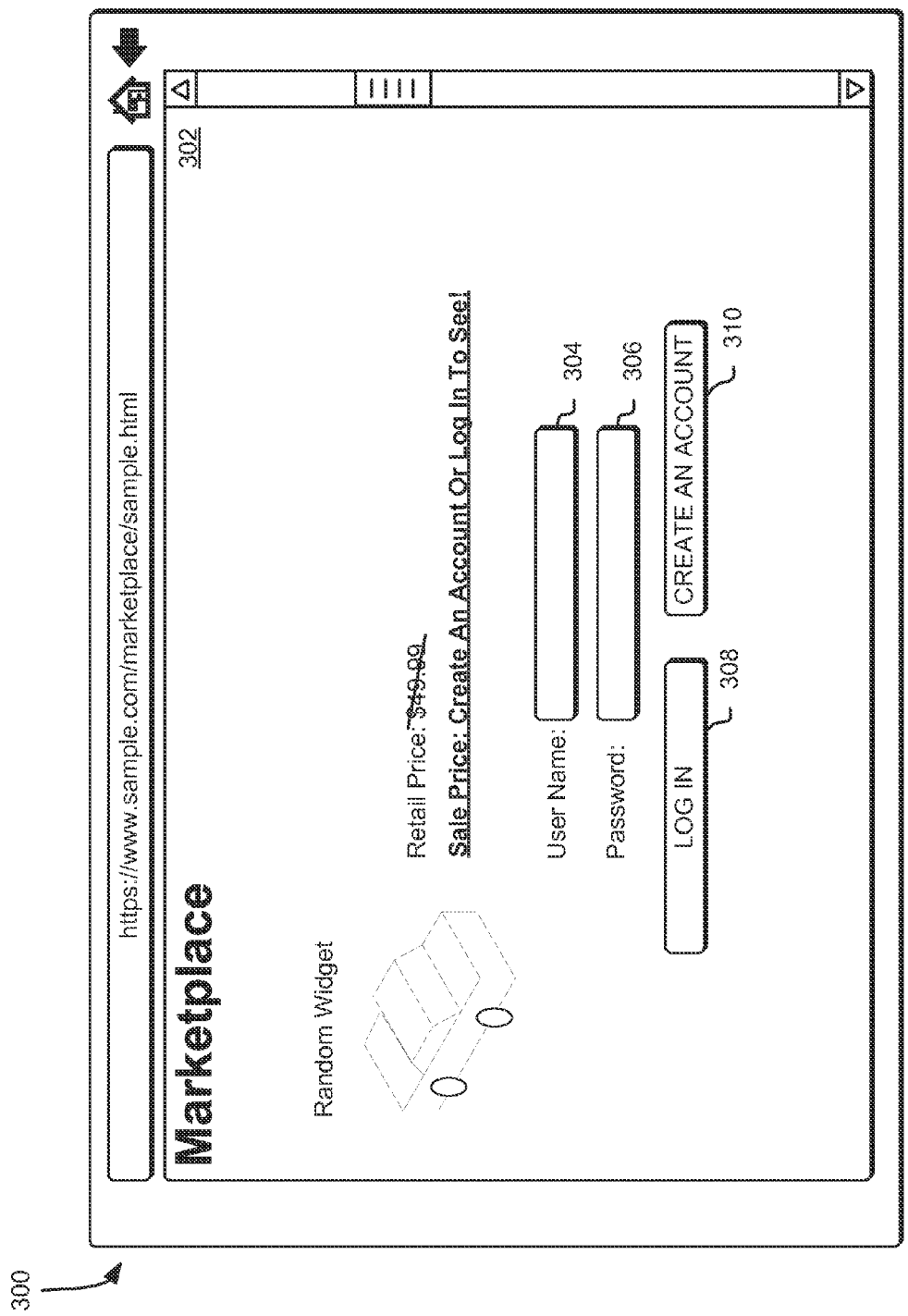
FIG. 3 shows an illustrative example of a client interface in which a user is required to provide a set of credentials in order to obtain additional information as a result of suspicion that the user may be an automated agent in accordance with at least one embodiment.

As noted above, if the bot mitigation system suspects that the customer is utilizing an automated agent or other automated process to access a particular site, the bot mitigation system may cause one or more content servers to provide the customer with an interstitial user interface component. This interstitial user interface component may require the customer to provide certain information before he/she is able to obtain some particular data from the requested site. Accordingly, FIG. 3 shows an illustrative example of a client interface 300 in which a user is required to provide a set of credentials in order to obtain additional information as a result of suspicion that the user may be an automated agent in accordance with at least one embodiment. In this illustrative example, the customer may transmit a request to access a particular site 302, which, when presented in its entirety, may include a description of a particular item for sale, a retail price, a sale price and a button to enable the customer to purchase the item for sale.

If the bot management system determines, based at least in part on identifying information provided by the customer through the request, the customer's prior activities, and any other trends, that the customer may be utilizing an automated agent or other automated process to access the site 302, the bot management system may cause the one or more content servers to modify the contents of the site 302 to prevent the customer from obtaining all available information until he/she provides additional information. For instance, as illustrated in FIG. 3, the one or more content servers may modify the site 302 to provide a user name input field 304, a password input field 306, a log in button 308 and an account creation button 310. Further, the one or more content servers may prevent the customer from viewing the sale price for the particular item presented on the site 302, thereby requiring the customer to provide his/her account credentials or create an account before the sale price is provided to him/her.

When the customer, through the user name input field 304 and the password input field 306, provides his/her set of account credentials, he/she may select the log in button 308 to provide the set of account credentials to the bot management system. The bot management system may determine whether this set of account credentials are legitimate and, if not, prevent further access to the missing information on the site 302. However, if the set of account credentials are legitimate, the bot mitigation system may determine, based at least in part on a variety of activity logs, whether this set of credentials have been used for suspicious activity. For instance, if the set of account credentials have been utilized an inordinate amount of times over a short time span, the bot mitigation system may further suspect that these credentials are being utilized by an automated agent or other automated process. Such a suspicion may result in an increase in the automated agent score for the particular customer, causing the bot mitigation system to present the customer with another interstitial user interface component or prevent any further access to the site 302.

If the customer selects the account creation button 310, the one or more content servers may present, through the client interface 300, an account creation site, which the customer may utilize to generate a new set of credentials and provide additional information about the customer to the computer-facilitated service. The customer's interactions with this account creation site may be recorded in order to determine whether these interactions are similar to known actions performed by suspected automated agents or other automated processes. If these interactions are similar to those performed by suspected automated agents or other automated processes, the bot mitigation system may calculate a higher automated agent score for the customer, which may result in more restrictive interstitial user interface components or termination of the customer's access to the site 302.

In some embodiments, if the bot management system determines, based at least in part on the set of account credentials provided by the customer, the customer's interaction with the limited site 302, and/or the customer's interactions with an account creation site, that the customer is not utilizing an automated agent or other automated process, the bot mitigation system may cause the one or more content servers to provide the full site 302 for the customer's use. For instance, the one or more content servers may modify the obscured sale price from the site 302 to display the actual sale price for the item presented to the customer. Additionally, the one or more content servers may remove the user name input field 304, password input field 306, log in button 308 and account creation button 310 from the site and present the customer with a button that may enable the customer to purchase the item displayed on the site 312.

Figure 4:
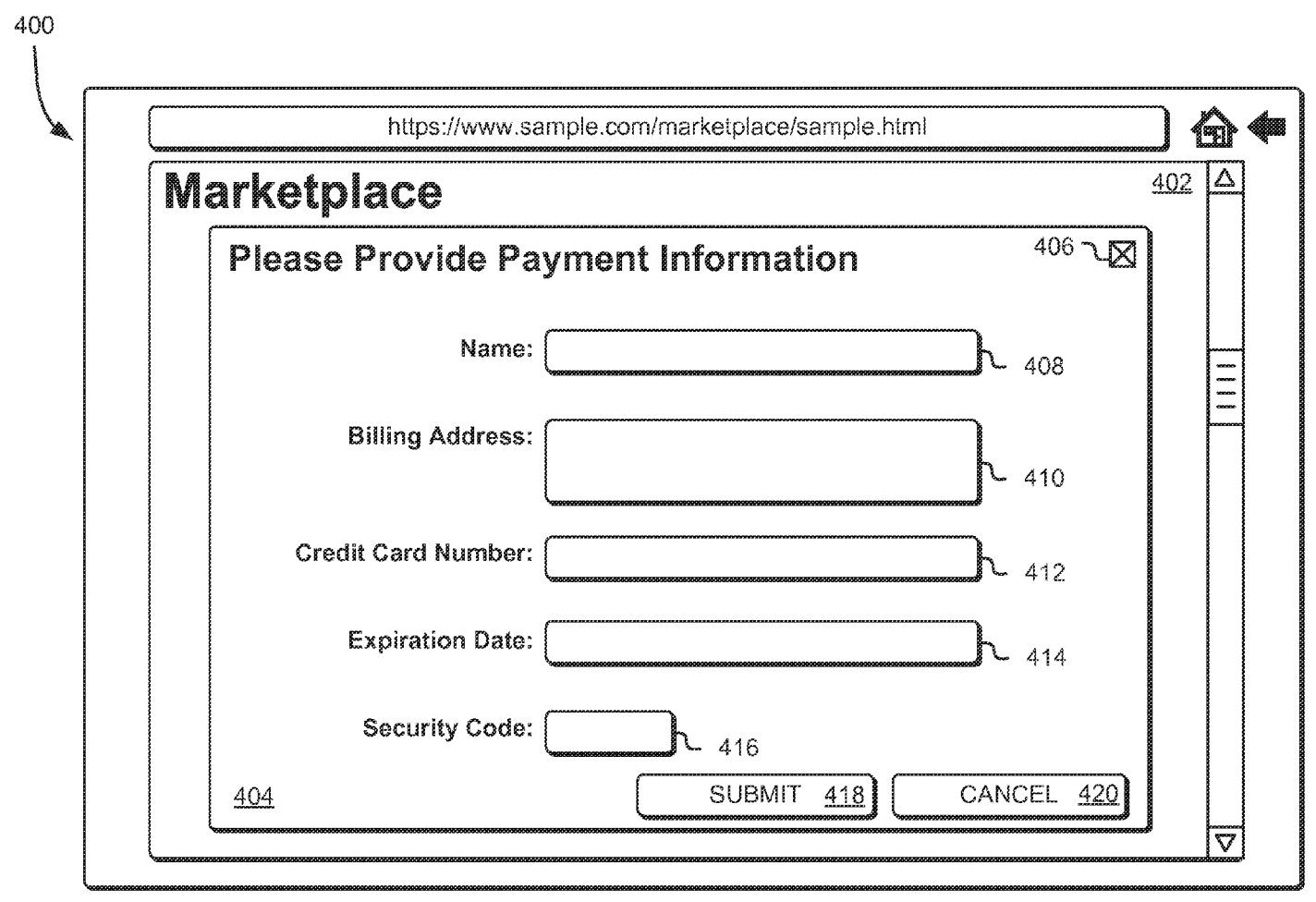

As noted above, if the bot mitigation system of the computer-facilitated service suspects that a particular request has been transmitted by an automated agent or other automated process, the bot mitigation system may cause one or more content servers to generate an interstitial user interface component, which may be presented to the customer in place of the requested site. In order to access the site, a customer may need to provide, through the interstitial user interface component, payment information to the computer-facilitated service or manually terminate the interstitial user interface component before he/she can access the requested site. Accordingly, FIG. 4 shows an illustrative example of a client interface 400 in which a user is required to provide payment information in order to obtain additional information as a result of suspicion that the user may be an automated agent in accordance with at least one embodiment.

The payment information interstitial user interface component 404 may be presented to the customer through the client interface 400 in a manner that obscures an underlying site 402, which the customer has requested access to. In some embodiments, the computer-facilitated service may provide, through the client interface 400, the payment information interstitial user interface component 404 without presenting any data or information from the site 402. Thus, a customer may need to finish interacting with the payment information interstitial user interface component 404 before the computer-facilitated service determines whether to enable the customer to access the requested site 402.

The payment information interstitial user interface component 404 may include a variety of input fields, which the customer may utilize to provide payment information that may be used to process any transactions between the customer and the computer-facilitated service. For instance, the payment information interstitial user interface component 404 may include a name input field 408 and a billing address field 410, which may enable the customer to provide his/her name and associated billing address, respectively. Further, the payment information interstitial user interface component 404 may include a credit card number input field 412, expiration date input field 414, and a security code input field 416, which may be used by the customer to provide his/her credit card information that can be used for payment purposes. The payment information interstitial user interface component 404 may include a submit button 418, which the customer may use to submit the provided information to the computer-facilitated service for storage and processing. The payment information interstitial user interface component 404 may also include a closure button 406 and a cancel button 420, which the customer may use to terminate the interstitial user interface component 404. It should be noted that in some embodiments, the payment information interstitial user interface component 404 may not include the closure button 406 and/or the cancel button 420. For instance, if, based at least in part on a calculated automated agent score or an action specified by the decision tree results in the computer-facilitated service having to present an interstitial user interface component that requires customer input, the computer-facilitated service may generate the payment information interstitial user interface component 404 without the cancel button 420 and the closure button 406 to prevent the customer from bypassing the interstitial user interface component 404.

As the customer interacts with the payment information interstitial user interface component 404, the computer-facilitated service may record these customer interactions within an activity log. This activity log may be used to update the automated agent score for the customer and determine any subsequent actions to be taken. Further, if the customer provides payment information using the interstitial user interface component 404, the computer-facilitated service may determine whether the information provided is suspicious and consistent with automated agent usage. For instance, the computer-facilitated service may access the activity log repository and determine whether the provided credit card information, name, and billing address have been used extensively over a short period of time. Additionally, the computer-facilitated service may determine whether the provided information is not real or whether the credit card has been reported as stolen by one or more law enforcement authorities. In some embodiments, the computer-facilitated service may perform a Luhn check or other analyses on the information provided in the credit card number input field 412 to determine whether the provided credit card number is valid. These analyses may be included as part of a decision tree logic used by the computer-facilitated service to determine whether the user client is suspect. If the information provided is suspect, the computer-facilitated service may prevent the customer from accessing the site 402 or present the customer with an additional and more restrictive interstitial user interface component. If the computer-facilitated service is using a probability distribution to determine how to proceed in the decision tree, there may be a low probability that the customer may be granted access to the site 402. If this does occur, the computer-facilitated service may continue to monitor the customer's activities on the site 402 and, if further suspicion is raised, terminate customer access to the site 402.

It should be noted that, in some embodiments, the various input fields presented to the customer through the payment information interstitial user interface component 404 may be arranged in a different manner than presented in FIG. 4. For instance, based at least in part on the calculated automated agent score, the computer-facilitated service may reorder the input fields within the payment information interstitial user interface component 404 to prevent usage of an automated process to complete the various input fields. Further, this may enable the computer-facilitated service to more accurately determine whether an automated agent is being used, as certain automated agents may be configured to provide information for the interstitial user interface component 404 in a particular manner. For example, if the credit card number input field 412 is presented above the name input field 408, the automated agent may provide, within the credit card number input field 412 a customer name, as this automated agent may be configured to assume that the name input field 408 would be presented first.

Figure 5:
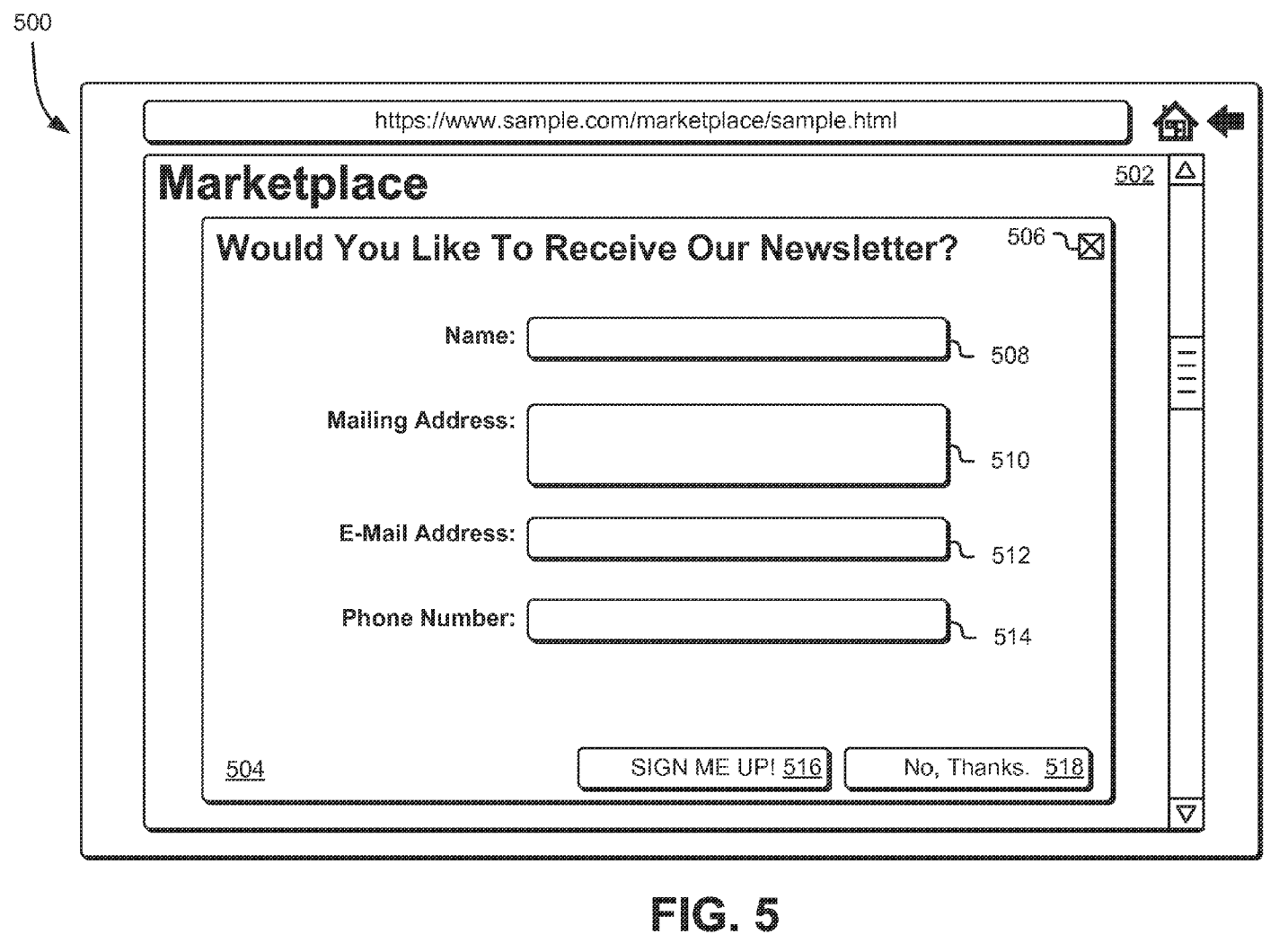

The computer-facilitated service may select, for customers, different interstitial user interface components that may be used to gather information about the customer and enhance the ability of the computer-facilitated service to determine whether an automated agent or other automated process is being used to access the site. For instance, instead of the payment information interstitial user interface component illustrated in FIG. 4, the computer-facilitated service may select an interstitial user interface component that may prompt the customer to determine whether he/she would like to receive a newsletter from the computer-facilitated service. Alternatively, this interstitial user interface component may be provided to the customer in addition to the payment information interstitial user interface component if there is still suspicion that an automated agent or other automated process is being used to access the site. Accordingly, FIG. 5 shows an illustrative example of a client interface 500 in which a user is required to determine whether he/she would like to receive a newsletter from the service as a result of suspicion that the user may be an automated agent in accordance with at least one embodiment. The client interface 500 may be similar to the one illustrated in FIG. 4 in that the client interface 500 may be used by customers of the computer-facilitated service to interact with content provided by the computer-facilitated service.

Similar to the payment information interstitial user interface component described above, the newsletter interstitial user interface component 504 may be presented to the customer through the client interface 500 in a manner that obscures an underlying site 502, which the customer has requested access to. In some embodiments, the computer-facilitated service may provide, through the client interface 500, the newsletter interstitial user interface component 504 without presenting any data or information from the site 502. Thus, a customer may need to finish interacting with the newsletter interstitial user interface component 504 before the computer-facilitated service determines whether to enable the customer to access the requested site 502.

The newsletter interstitial user interface component 504 may include a variety of input fields, which the customer may utilize to provide his/her contact information that may be used by the computer-facilitated service to deliver a newsletter to the customer. For instance, the newsletter interstitial user interface component 504 may include a name input field 508, a mailing address input field 510, an e-mail address input field 512, and a phone number input field 514. Through these input fields, the customer may provide his/her name, mailing address, e-mail address, and phone number, respectively. It should be noted that the newsletter interstitial user interface component 504 may include additional, alternative, or fewer input fields dependent on the computer-facilitated service preferences and requirements. In some embodiments, a customer may not be required to provide input for each input field so long as the customer has provided at least one contact method.

The newsletter interstitial user interface component 504 may include a signup button 516, which, when selected, may transmit the provided information in the various input fields to the computer-facilitated service for processing. This information may be stored within a customer profile and may enable the computer-facilitated service to provide the newsletter to the customer through the specified contact information. The computer-facilitated service may further utilize this information to determine whether the information provided is suspicious and consistent with automated agent usage. For instance, the computer-facilitated service may access the activity log repository and determine whether the provided contact information has been used extensively over a short period of time. Additionally, the computer-facilitated service may determine whether the provided information is not real. If the information provided is suspect, the computer-facilitated service may prevent the customer from accessing the site 402 or present the customer with an additional and more restrictive interstitial user interface component. If the computer-facilitated service is using a probability distribution to determine how to proceed in the decision tree, there may be a low probability that the customer may be granted access to the site 402. If this does occur, the computer-facilitated service may continue to monitor the customer's activities on the site 402 and, if further suspicion is raised, terminate customer access to the site 402.

The newsletter interstitial user interface component 504 may further include a closure button 506 and a cancel button 518, which may be used to terminate the interstitial user interface component 504. In some embodiments, the newsletter interstitial user interface component 504 may be configured to be more restrictive and thus may not include these buttons 506, 518. This may force the customer to provide at least some contact information that the computer-facilitated service may use to determine whether interaction with the newsletter interstitial user interface component 504 is consistent with automated agent usage. For instance, if the newsletter interstitial user interface component 504 is provided to the customer after interacting with another interstitial user interface component, the computer-facilitated service may have determined that there remains suspicion that the customer may be utilizing an automated agent or other automated process and, thus, additional information is required. In such cases, the newsletter interstitial user interface component 504 may not include the closure button 506 or the cancel button 518, preventing the customer from bypassing the interstitial user interface component 504.

It should be noted that, in some embodiments, the various input fields presented to the customer through the newsletter interstitial user interface component 504 may be arranged in a different manner than presented in FIG. 5. For instance, based at least in part on the calculated automated agent score, the computer-facilitated service may reorder the input fields within the newsletter interstitial user interface component 504 to prevent usage of an automated process to complete the various input fields. Further, this may enable the computer-facilitated service to more accurately determine whether an automated agent is being used, as certain automated agents may be configured to provide information for the interstitial user interface component 504 in a particular manner. For example, if the phone number input field 514 is presented above the name input field 508, the automated agent may provide, within the phone number input field 514 a customer name, as this automated agent may be configured to assume that the name input field 508 would be presented first.

Figure 6:
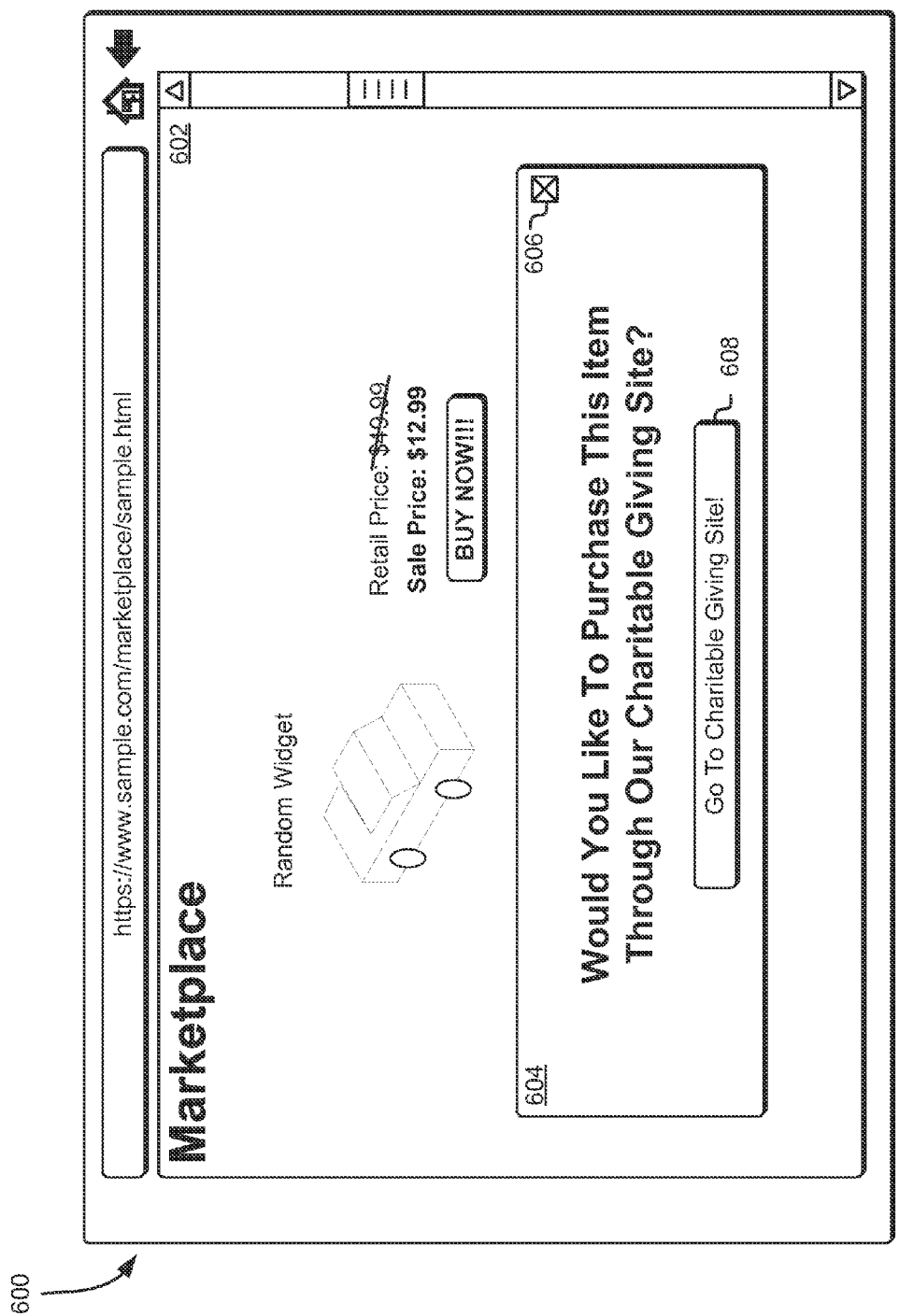
FIG. 6 shows an illustrative example of a client interface in which a user is presented with the option to access a charitable giving site as a result of suspicion that the user may be an automated agent in accordance with at least one embodiment.

In some embodiments, an interstitial user interface component need not obscure all information displayed on a particular site, such as those illustrated above in connection with FIGS. 4 and 5. For instance, an interstitial user interface component may be presented to the customer along with portions of the site. In such instances, the customer may be required to interact with the interstitial user interface component before he/she may interact with the site itself. Accordingly, FIG. 6 shows an illustrative example of a client interface 600 in which a user is presented with the option to access a charitable giving site as a result of suspicion that the user may be an automated agent in accordance with at least one embodiment. The client interface 600 may be similar to the client interfaces described above in connection with FIGS. 3-5.

The charitable giving site interstitial user interface component 604 may be presented to the customer through the client interface 600 in a manner that enables the customer to obtain information from a portion of the underlying site 602, which the customer has requested access to. In some embodiments, the computer-facilitated service may provide, through the client interface 600, the charitable giving site interstitial user interface component 604 in a manner that prevents the customer from interacting with any input fields or buttons included on the site 602. For instance, as illustrated in FIG. 6, the customer may be unable to utilize the "BUY NOW!!!" button on the site 602 until he/she has terminated the interstitial user interface component 604 through use of the closure button 606. Thus, a customer may need to finish interacting with the interstitial user interface component 604 before the computer-facilitated service determines whether to enable the customer to access the input items on the site 602.

The charitable giving site interstitial user interface component 604 may present, to the customer, an option to access an alternative site to obtain particular information normally presented on the site 602. For instance, through the interstitial user interface component 604, the customer may select the redirect button 608 to access a charitable giving site in which the customer may interact with an alternative version of the site 602 originally requested. Through this alternative site, the computer-facilitated service may monitor the customer's activities to determine whether to maintain a suspicion that an automated agent or other automated process is being utilized or to dispel such suspicion and enable the customer to utilize either site freely. The charitable giving site interstitial user interface component 604 may include a closure button 606, which the customer may use to terminate the interstitial user interface component 606 and access the site 602. In some embodiments, the computer-facilitated service may redirect the customer to an alternative site, present the customer with an alternative interstitial user interface component, or terminate the customer's access to the site 602 if, based at least in part on interaction with the interstitial user interface component 604, the computer-facilitated service maintains a suspicion that an automated agent or other automated process has been used to access the site 602.

Figure 7:
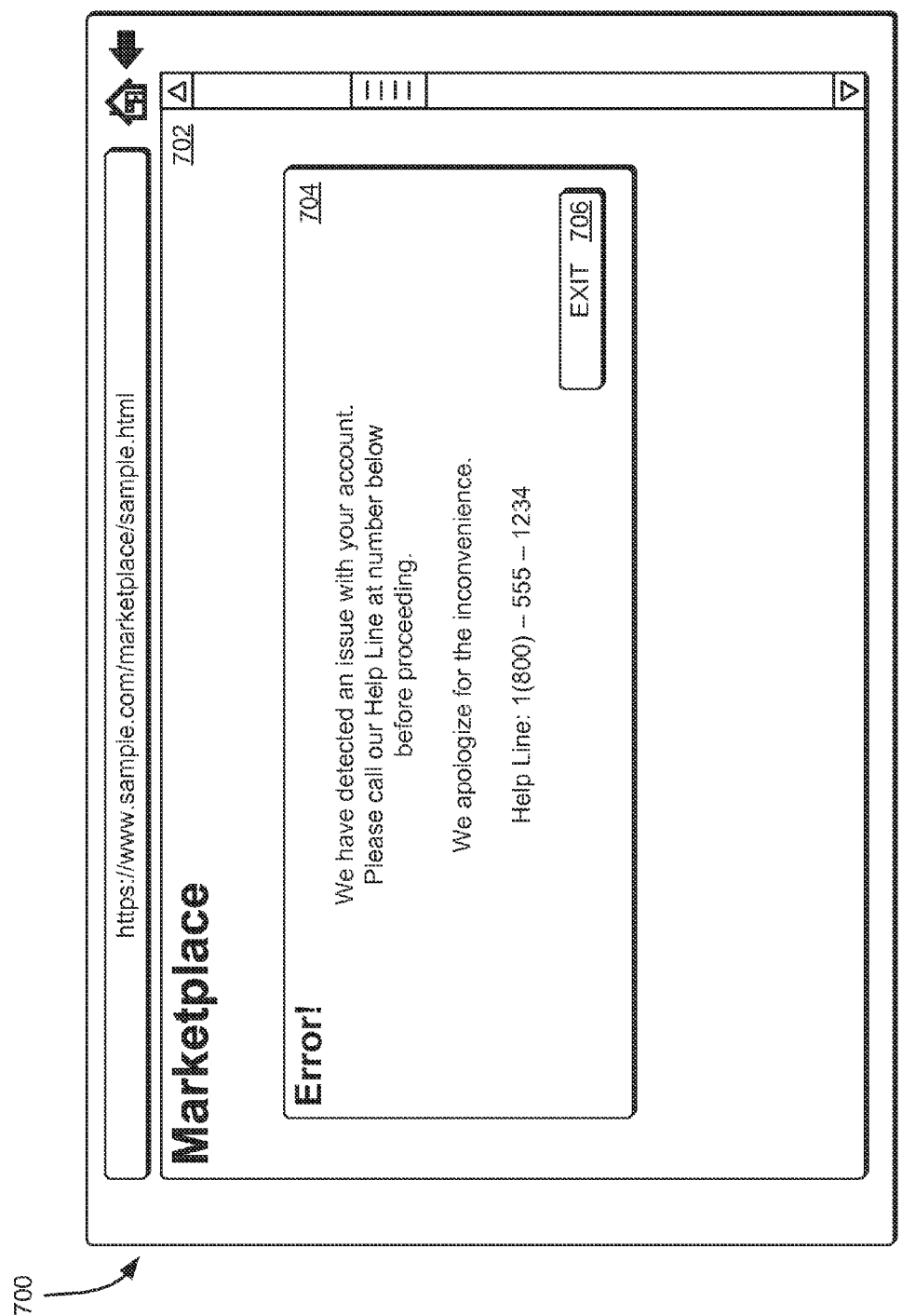
FIG. 7 shows an illustrative example of a client interface in which a user is prohibited from accessing a particular site as a result of suspicion that the user may be an automated agent in accordance with at least one embodiment.

As noted above, if the computer-facilitated service determines that a calculated automated agent score for a customer exceeds a maximum threshold, the computer-facilitated service may present the customer with a blocking interstitial user interface component, which may prompt the customer to contact an administrator or a help line in order to determine what remedial actions the customer may perform to access the requested site. The blocking interstitial user interface component may prevent the customer from bypassing the interstitial user interface component to access the site, presenting the customer with the option to terminate his/her connection to the computer-facilitated service. Accordingly, FIG. 7 shows an illustrative example of a client interface 700 in which a user is prohibited from accessing a particular site 702 as a result of suspicion that the user may be an automated agent in accordance with at least one embodiment.

The blocking interstitial user interface component 704 may include an important notification that may prompt the customer to contact an administrator or a help line before he/she can access the requested site 702. As opposed to the interstitial user interface components described above in connection with FIGS. 4-6, the blocking interstitial user interface component may not include a closure button or a cancel button that may enable the customer to terminate the interstitial user interface component and access the site 702. The lack of such buttons may prevent the customer from bypassing this blocking interstitial user interface component 704 to access the site 702. The blocking interstitial user interface component 704 may include an exit button 706 that, when selected, may terminate the communications session between the customer and the computer-facilitated service. In some embodiments, selection of the exit button 706 may terminate the client interface 700 altogether.

Figure 8:
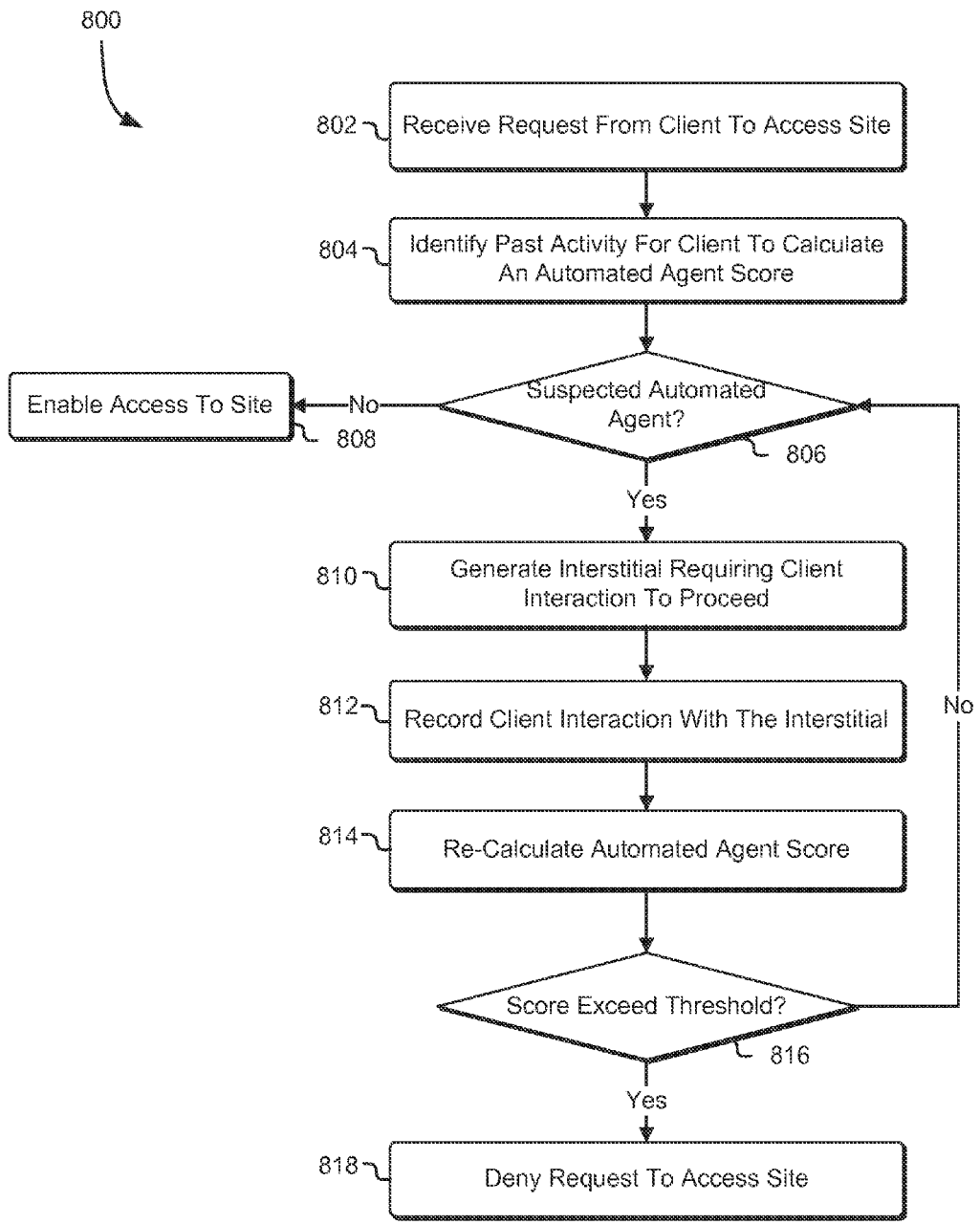
FIG. 8 shows an illustrative example of a process for calculating an automated agent score for a user client based at least in part on activity of the user client within a particular site and determining a course of action based at least in part on the automated agent score in accordance with at least one embodiment.

As noted above, the computer-facilitated service may calculate a automated agent score for a customer when he/she submits a request to access a particular site. This automated agent score may be used to determine whether the customer is to be granted access to the site, presented with an interstitial user interface component, or denied access to the site. Accordingly, FIG. 8 shows an illustrative example of a process 800 for calculating an automated agent score for a user client based at least in part on activity of the user client within a particular site and determining a course of action based at least in part on the automated agent score in accordance with at least one embodiment. The process 800 may be performed by a bot mitigation system of the computer-facilitated service, which may be configured to access customer profiles and activity logs to identify customer activity. Additionally, the bot mitigation system may be configured to transmit requests to one or more content servers to generate one or more interstitial user interface components as needed based at least in part on the calculated automated agent score for the particular customer client.

A customer of the computer-facilitated service may utilize a user client (e.g., web browser application, etc.) to transmit a request to access a particular site. For instance, a customer may provide the user client with a URL of the particular site he/she wishes to access, which may cause the user client to generate a request to a server corresponding to the provided URL to access particular site content. Alternatively, automated agents or other automated processes may transmit numerous requests to access a particular site to obtain site content, obtain customer information, and other potentially nefarious purposes. Thus, the bot mitigation system may receive 802 this request from a user client to access a particular site. The request may include identifying information, such as the IP address of the customer and, in some instances, a set of customer credentials that may be used to access the requested site.

Once the bot mitigation system has received the request to access a particular site, the bot mitigation system may identify 804 any activity performed by the customer through previous interactions with the site or other resources provided by the computer-facilitated service to calculate an automated agent score. For instance, the bot mitigation system may access an activity log repository and utilize the provided IP address within the request to determine the frequency and extent in which requests have emanated from the provided IP address. For example, if the same IP address is reported an unusual (e.g., inordinate or excessive) number of times over a short period time, there may be greater suspicion of automated agent usage. Additionally, if the customer has provided a set of credentials to access the site, the bot mitigation system may determine whether this particular account has been accessed an unusual number of times or if the set of credentials are even valid. All of this may be used as input for an automated agent score calculation algorithm, which may be used to compute a particular automated agent score for the customer client and determine 806, based at least in part on the calculated automated agent score, whether there is suspicion of automated agent usage.

The bot mitigation system may determine one or more automated agent score factors that may be utilized within the automated agent score calculation algorithm to obtain an automated agent score for the customer client. For instance, each automated agent score factor may be multiplied together to generate a final automated agent score, which may be used to determine a level of suspicion that the customer client is an automated agent. Each automated agent score factor may be calculated as a value between 1 (e.g., lowest suspicion) and 10 (e.g., greatest suspicion), although in some embodiments each factor may be weighed differently and thus have a stronger or weaker effect on the final automated agent score. For example, for an IP address automated agent score factor, a lower factor value may be assigned if the provided IP address is mapped to a known and trusted location and has not been utilized in suspicious activity (e.g., inordinate number of requests emanating from the IP address, etc.), whereas a higher factor value may be assigned if the IP address is mapped to a suspect location (e.g., rogue nation, known bastion for suspicious activity, etc.). As another example, for a customer physical address automated agent score factor, a lower factor value may be assigned if the customer's physical address similarly has is of a known and trusted location and has not been involved in a significant amount of transactions or requests, is located in a stable geographic region (e.g., exceedingly low incidence of cyber-terrorism and espionage etc.).

In an alternative embodiment, the bot mitigation system may be configured to assign a different weight to each of the automated agent score factors based at least in part on a statistical analysis of known automated agent methods and techniques for accessing various sites and obtaining information. For instance, if a particular mechanism used by an automated agent is associated with a particular automated agent score factor, the bot mitigation system may assign a greater weight to this automated agent score factor. Subsequently, once each automated agent score factor has been weighed based at least in part on the commonality of the automated agent mechanisms, the bot mitigation system may sum these weighted factors together to obtain a raw automated agent score for the customer client. The bot mitigation system may normalize the raw automated agent score to fit within a particular range. For instance, the bot mitigation system may normalize the raw automated agent score to generate a final, composite automated agent score that may be between 0 and 1.

If, based at least in part on the automated agent score, the bot mitigation system determines that the customer is not utilizing an automated agent or other automated process to access the site, the bot mitigation system may enable 808 the customer to access the requested site. However, if the bot mitigation system determines, based at least in part on the calculated automated agent score, that there is suspicion that the request emanated from an automated agent or other automated process, the bot mitigation system may generate 810 an interstitial user interface component requiring user client interaction by the customer/automated agent in order to proceed. For instance, the bot mitigation system may transmit a request to one or more content servers to construct an interstitial user interface component that is to be provided to the customer/automated agent through the user client. The interstitial user interface component may include a variety of elements that may allow a customer/automated agent to provide information that may be collected by the bot mitigation system. For instance, as illustrated in FIGS. 4 and 5, a customer/automated agent may provide a customer name, physical address, e-mail address, payment information, phone numbers and the like through the interstitial user interface component. This information may be received by the bot mitigation system. Alternatively, the customer/automated agent may attempt to bypass the interstitial user interface component, in some cases, by selecting a closure button or cancel button, such as those illustrated in FIGS. 4-6.

In some embodiments, based at least in part on the automated agent score, if the bot mitigation system determines that there is suspicion that the request emanated from an automated agent or other automated process, the bot mitigation system may restrict certain customer interactions with the particular site. For instance, if the customer utilizes, through a client application (e.g., browser), an auto-filling sub-routines to automatically fill out any number of forms on the site, the bot mitigation system, based at least in part on the calculated automated agent score, may disable use of the sub-routines for the site or any interstitials presented to the customer. Additionally, or alternatively, based at least in part on the calculated automated agent score, the bot mitigation system may prevent the customer from utilizing an auto-filling sub-routine to provide his/her set of credentials upon request. In other embodiments, if the automated agent score results in suspicion that the request emanated from an automated agent or other automated process but the score is below a certain threshold, the bot mitigation system may permit use of these auto-filling sub-routines for any interstitial user interface component presented to the customer.

As the customer/automated agent interacts with the generated interstitial user interface component, the bot mitigation system may record any user client interaction with the interstitial user interface component. For instance, if the customer/automated agent has provided, through the interstitial user interface component, a customer name, physical address and payment information, the bot mitigation system may record this information within a customer profile or other data repository for later use. Additionally, the bot mitigation system may record any cursor movement within the interstitial user interface component, the amount of time spent navigating through the interstitial user interface component, the order of operations performed by the customer/automated agent, and the like. This newly acquired information may be used to re-calculate 814 an automated agent score for the customer/automated agent.

Based at least in part on the re-calculated automated agent score, the bot mitigation system may determine 816 whether this new automated agent score exceeds a maximum threshold value, wherein the bot mitigation service may determine, with a high degree of certainty, that an automated agent or other automated process is being used to access the site. If the re-calculated automated agent score does exceed this maximum threshold value, the bot mitigation system may deny 818 the received request to access the site, as the requestor may be an automated agent or other automated process. In some embodiments, the bot mitigation system may generate a blocking interstitial user interface component, such as the blocking interstitial user interface component illustrated in FIG. 7, to notify the customer that he/she is required to contact an administrator or a help line in order to identify one or more remedial actions that must be performed to restore access to the site. Once the customer has performed these one or more remedial actions, the bot mitigation system may re-calculate the automated agent score to determine whether the score has been reduced to a point where either access to the site is granted or another interstitial user interface component is required.

In an alternative embodiment, if the automated agent score does exceed the maximum threshold value, the bot mitigation system may present one or more challenges to the user client. These one or more challenges, in some cases, may be tunable. For example, the challenge may be made more difficult as load on a system increases. Difficulty may vary in one or more aspects. For example, in some embodiments, difficulty is varied by varying the number of computations required, on average, to successfully complete the challenge. Other types of computing resource usage may also be varied in addition to or instead of varying the computational difficulty. For example, the amount of memory usage required to complete a challenge may be varied. Generally, any type of computing resource usage that may be varied may be used to vary the difficulty of the challenge. Other variations are also considered as being within the scope of the present disclosure.

To manage system load, various embodiments of the present disclosure require customer or automated agents to provide proof of work before corresponding requests are processed. Proof of work may comprise information from which completion of the work is verifiable, examples of which are discussed above and below. In many embodiments, completing the work is more difficult than verifying the work, where difficulty is measurable in terms of computing resource usage, such as CPU cycles, memory usage, network bandwidth, and/or other measurable aspects of computing resource usage. A customer or automated agent may submit a request to access a site. Before servicing the request, the bot mitigation system determines, based at least on the customer's or automated agent's completion of one or more interstitial user interface components and/or prior activity, that the customer's or automated agent's automated agent score exceeds a maximum threshold value. In response, the bot mitigation system may provide a challenge to the customer or automated agent. The challenge may be provided as code that is executable by the customer or automated agent without a client having to be specifically configured (e.g., preprogrammed) to be able to perform the challenge. For example, the challenge may be provided as a script of an industry standard scripting language, such as JavaScript or ActionScript. If the client is configured to be able to process the content from the system, the client would also be configured to be able to process the challenge. For example, if the client requests website content that includes JavaScript or ActionScript, the client would be already able to complete a challenge encoded in JavaScript or ActionScript. Further, in various embodiments, the challenge provided to the client may encode or otherwise specify the algorithm the client is to use to complete the challenge, although various embodiments of the present disclosure may provide challenges in other ways. For instance, the challenge may be to compute a number having certain properties, the client being free to use any suitable algorithm for finding a number having the properties.

To have the request successfully processed by the bot mitigation system, the client may then complete the challenge, for example, by executing a script that encodes the challenge. Once complete, the client may provide to the bot mitigation system proof that the challenge was completed. The proof that the challenge was completed may comprise information from which successful completion of the challenge can be verified by the bot mitigation system. For example, in an embodiment, a challenge may be a challenge to use a function (such as a hash function) to compute a number having certain properties. The client may use the function to compute such a number having the properties and provide proof to the bot mitigation system. The proof may, for instance, be input to the function that the client used to obtain the number having the properties. The bot mitigation system may then verify that the input the client used indeed results in a number that has the properties specified by the challenge. As another example, the challenge may be to obtain a prime factorization for a number provided to the client by the bot mitigation system. The client may factor the number and provide the prime factorization in the challenge completion proof to the bot mitigation system. As evident from the above illustrative examples, in various embodiments, the challenge is configured such that the challenge is computationally easier to verify than to complete. For example, with the example of obtaining a prime factorization of a number, known techniques for factoring numbers are computationally more difficult than multiplication, which may be used to verify a proposed prime factorization. Once the bot mitigation system verifies that the challenged completion proof indicates the successful completion of the challenge, the bot mitigation system may provide a response to the client to the request that the client initially submitted. Example techniques usable by a bot mitigation system are described in significant detail in U.S. patent application Ser.

No. 13/766,350, filed Feb. 13, 2013, entitled "Managing System Load," which is hereby incorporated in its entirety by reference.

If the re-calculated automated agent score does not exceed the maximum automated agent score threshold, the bot mitigation system may determine 806, based at least in part on this re-calculated automated agent score, whether the suspicion about automated agent usage remains. If the suspicion is still present, the bot mitigation system may generate a new interstitial user interface component and record any interactions with this new interstitial user interface component to obtain additional information that may be used to determine whether an automated agent is being utilized or not. This new interstitial user interface component may be more restrictive in that the customer may no longer be able to terminate the interstitial user interface component by selecting a closure button or a cancel button. Thus, the customer may be required to provide the requested information in order to process. If, based at least in part on the re-calculated automated agent score, the customer is no longer suspected of utilizing an automated agent or other automated process to access the site, the bot mitigation system may enable 808 the customer to access the requested site.

Figure 9:
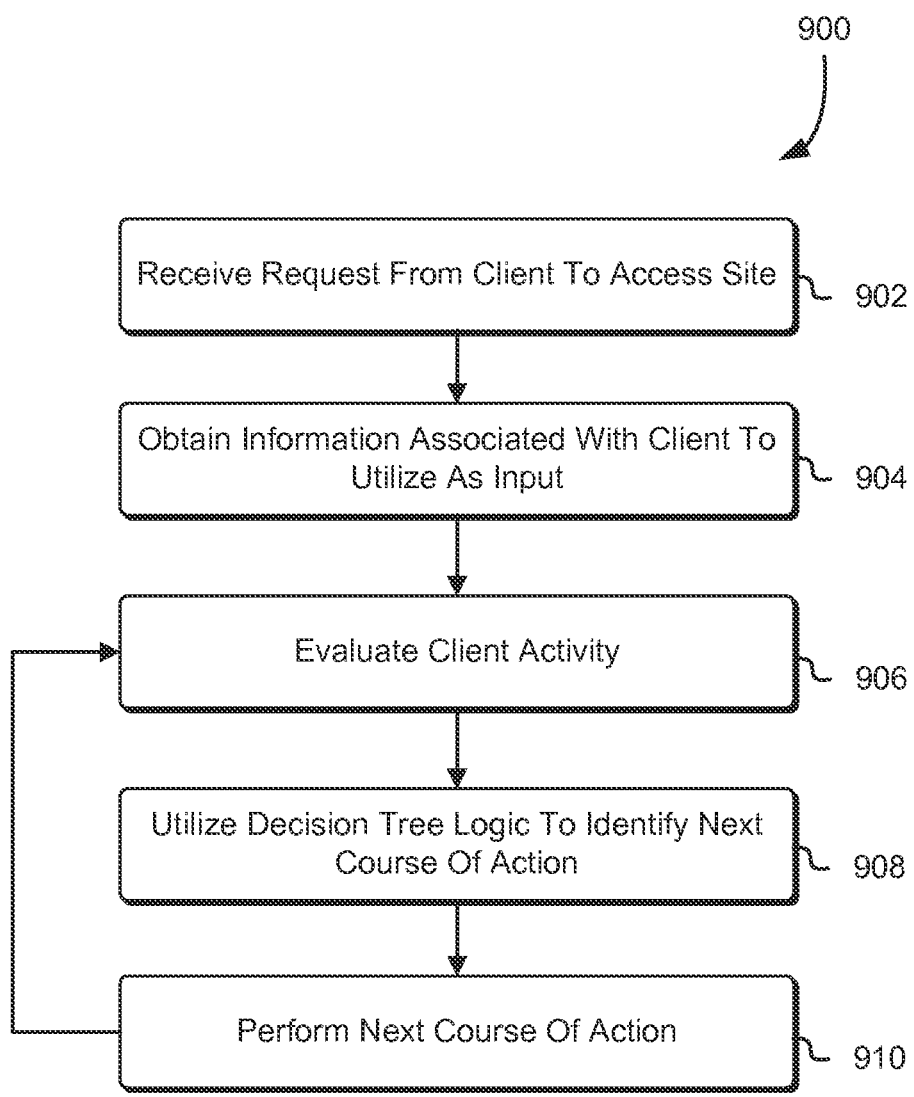
FIG. 9 shows an illustrative example of a process for utilizing a decision tree for determining a course of action upon receiving a request from a user client to access a particular site in accordance with at least one embodiment.

As noted above, the bot mitigation system may be configured to utilize decision tree logic to determine what action is to be taken upon receipt of a request to access a particular site. Each node within the decision tree may correspond to particular information provided within the request and obtained from activity logs and the customer's profile. As more information is obtained, the paths may terminate, resulting in an action that is to be performed. Accordingly, FIG. 9 shows an illustrative example of a process 900 for utilizing a decision tree for determining a course of action upon receiving a request from a user client to access a particular site in accordance with at least one embodiment. The process 900 may be performed by the aforementioned bot mitigation system, which may be configured to receive and process requests transmitted by a user client to access a particular site provided by the computer-facilitated service. Additionally, the bot mitigation system may be configured to access customer profiles and activity logs to identify and evaluate customer activity.

Similar to the process described above in connection with FIG. 8, the bot mitigation system may receive 902 a request from a user client to access a particular site. The request may include identifying information, such as the IP address of the customer and, in some instances, a set of customer credentials that may be used to access the requested site. Once the bot mitigation system has received this request, the bot mitigation system may obtain 904 information associated with the customer's user client to utilize as input for the one or more algorithms usable to determine what course of action is to be taken in response to the request. For instance, the bot mitigation system may access an activity log repository and the customer's profile to determine any prior user client activity in accessing one or more sites provided by the computer-facilitated service.

Once the bot mitigation system has obtained information associated with the customer's user client and the information included within the request to access the site, the bot mitigation system may evaluate 906 the customer's user client activity to identify other information that may be used as input for a decision tree. For instance, the bot mitigation system may utilize 908 decision tree logic to identify the course of action to be taken in response to the customer request to access the site and, subsequently, perform 910 the prescribed course of action. For example, the decision tree logic may cause the computer-facilitated service to undertake more restrictive actions based at least in part on information garnered through request and the activity logs for the customer. For instance, if the IP address of the customer is determined to be suspect (e.g., an inordinate number of requests emanate from the particular IP address, suspicious activity has been performed by users reporting the IP address, etc.), the computer-facilitated service may require the customer, through an interstitial user interface component, to provide a physical address where the customer may be located.

Once the bot mitigation system has performed the prescribed course of action, the bot mitigation system may evaluate 906 the customer's subsequent activity to identify a subsequent course of action to be taken. Utilizing the example above, if the physical address provided by the customer in response to presentation of the interstitial user interface component is suspect (e.g., an inordinate number of users are utilizing the same address to access the site, the address is fictional, etc.) or the customer has failed to provide a physical address, the bot mitigation system may generate a blocking interstitial user interface component, which may prevent the customer from accessing the site until he/she contacts an administrator of the site or a particular help line associated with the computer-facilitated service to obtain instructions for restoring access to the site.

Figure 10:
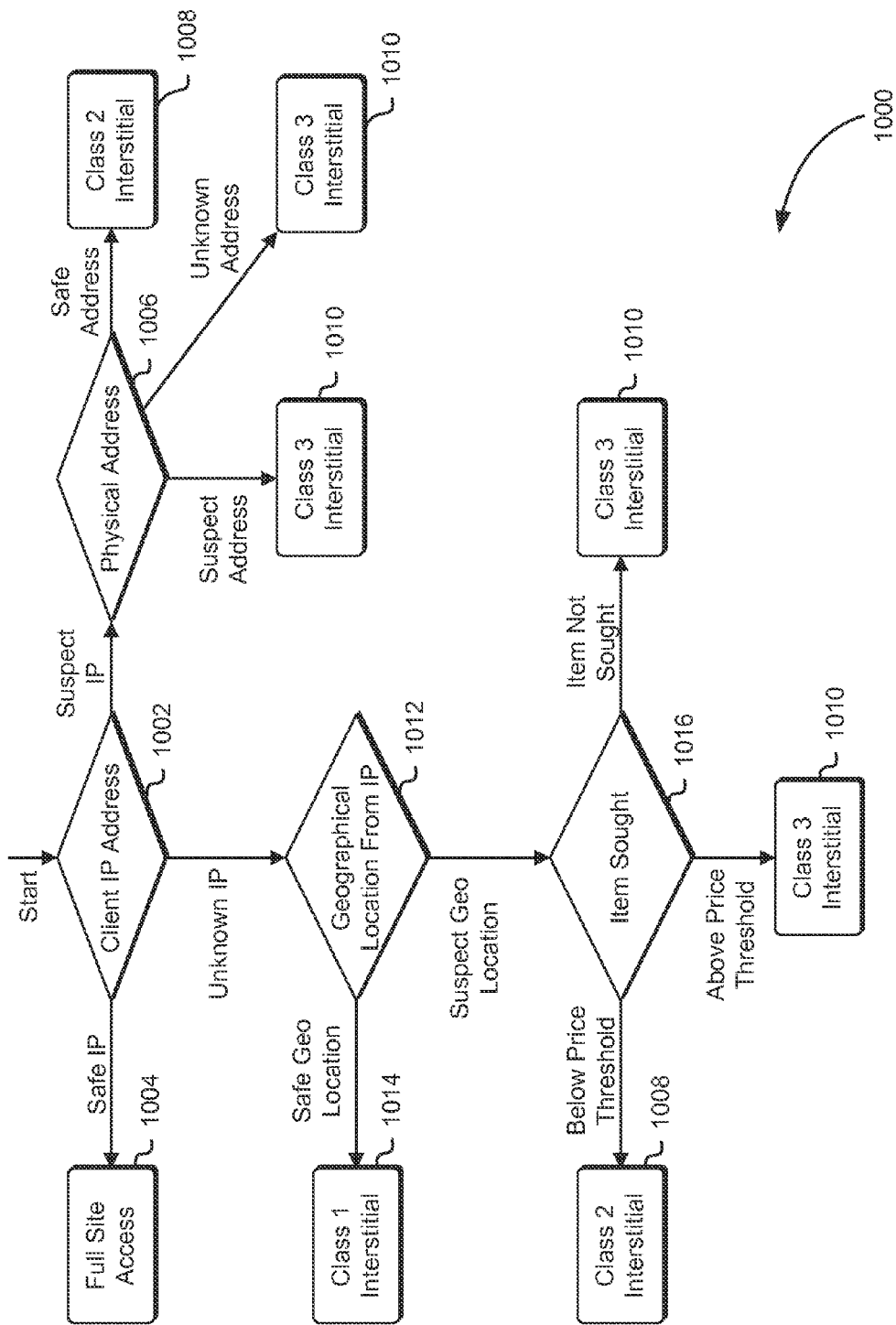
FIG. 10 shows an illustrative example of a decision tree for determining what action is to be performed with regard to a user client based at least in part on information gathered from the user client in accordance with at least one embodiment.

As noted above, a bot mitigation system of a computer-facilitated service may utilize decision tree logic to identify a course of action to be taken in response to a customer request to access a particular site. The decision tree logic may utilize various inputs, such as the customer's IP address, the customer's physical address and the like to identify the course of action to be taken. Accordingly, FIG. 10 shows an illustrative example of a decision tree 1000 for determining what action is to be performed with regard to a user client based at least in part on information gathered from the user client in accordance with at least one embodiment.

The decision tree 1000 may have, as an initial node, an evaluation of the customer's IP address 1002 through which the request to access a particular site is transmitted to the computer-facilitated service. The bot mitigation system may evaluate the provided IP address to determine whether the IP address may be deemed safe (e.g., no unusual activity associated with the IP address), suspect (e.g., unusual activity associated with the IP address), or unknown (e.g., no known instance of IP address usage within the activity logs). If the bot mitigation system determines that the IP address is safe, the bot mitigation system may follow the safe path of the decision tree and reach a full site access node 1004, which may cause the bot mitigation system to enable the customer to access the site without need for additional information.

If the bot mitigation system determines that the IP address is suspect, the bot mitigation system may follow the suspect path from the IP address node 1002 to a physical address node 1006, which may cause the bot mitigation system to evaluate a physical address for the customer. For instance, the bot mitigation system may access the customer's profile to identify any address on file that may be utilized in the analysis. Alternatively, the customer may have provided a physical address through the request. In some embodiments, the customer may not have previously provided a physical address at all. If the bot mitigation system determines that the physical address on file for the customer is safe, the bot mitigation system may follow a safe path from the physical address node to reach a Class 2 interstitial user interface component node 1008. This may cause the bot mitigation system to provide, to the customer, a Class 2 interstitial user interface component that the customer must interact with in order to proceed. A Class 2 interstitial user interface component may be an interstitial user interface component that requires customer input and prevents the customer from bypassing or terminating the interstitial user interface component without providing the requested information. For instance, a Class 2 interstitial user interface component may include the interstitial user interface component illustrated in FIG. 4, except without the closure button or the cancel button. Through this interstitial user interface component, the bot mitigation system may obtain additional customer information that may be used to follow particular paths within the decision tree 1000.

If the bot mitigation system determines that the physical address for the customer is suspect (e.g., fictional or associated with unusual activity) or cannot be identified, the bot mitigation system may follow the corresponding paths, which both terminate at a Class 3 interstitial user interface component node 1010. This may cause the bot mitigation system to display a Class 3 interstitial user interface component, such as the interstitial user interface component illustrated in FIG. 7, which may prevent the customer from accessing the site until he/she contacts an administrator or help line and performs remedial actions to restore access to the site.

If the bot mitigation system receives an unknown IP address, the bot mitigation system may take the unknown IP path from the IP address node 1002 to reach a geographical IP location node 1012, which may cause the bot mitigation system to identify the geographical location mapped to the provided IP address. If the bot mitigation system determines that that geographical location is safe (e.g., a trusted nation, etc.), the bot mitigation system may follow the safe geographical location path to reach a Class 1 interstitial user interface component node 1014. This may cause the bot mitigation system to generate and present to the customer a Class 1 interstitial user interface component. Examples of a Class 1 interstitial user interface component include the interstitial user interface components illustrated in FIGS. 4-6 (e.g., enable customer to bypass or terminate the interstitial user interface component) or the prompts illustrated in FIG. 3, wherein a customer may access a portion of the requested site but may access other portions only after certain input is provided.

The bot mitigation system may follow a suspect geographical location path from the geographical IP location node 1012 if the determined geographical location includes a rogue nation-state or other locations known for automated agent usage. The suspect geographical location path may lead to an item sought node 1016, which may cause the bot mitigation system to determine which site the customer has requested access to. For instance, if the computer-facilitated service provides a marketplace wherein customers may purchase items, the customer may request access to particular sites for items he/she wishes to purchase. The bot mitigation system may determine the price of the item sought and follow certain paths based at least in part on a price threshold. For instance, as illustrated in FIG. 10, if the item sought is below a certain price threshold, the bot mitigation system may follow the below price threshold path from the item sought node 1016 to reach a Class 2 interstitial user interface component node 1008. This may cause the bot mitigation system to display a Class 2 interstitial user interface component, as described above. However, if the item exceeds the price threshold or the customer is attempting to access a site that does not include an item for purchase (e.g., account access site, etc.), the bot mitigation system may follow the corresponding paths to reach a Class 3 interstitial user interface component node 1010, which may cause the bot mitigation system to present the customer with a blocking interstitial user interface component.

It should be noted that the decision tree 1000 may include additional and/or alternative nodes and paths that may cause the bot mitigation system to perform a variety of actions based at least in part on customer input. Alternatively, the decision tree 1000 may utilize a probability distribution, which the bot mitigation system may use to determine how to proceed in the decision tree 1000. For instance, an input into a node of a decision tree 1000 may be one of N classifications (where N is a positive integer representing a number of paths that can be taken from the node). An input may be classified in one of N ways and, for each of the N ways, there may be a corresponding probability distribution that is used to select a path. The path may be selected probabilistically (e.g., according to a Monte Carlo method) in accordance with how the input is classified. As an illustrative example, the IP address can be classified as suspect, unknown, or safe, as illustrated in FIG. 10. There may be three paths that may be taken from a node 1002 in a decision tree 1000 that corresponds to the IP address. If the IP address is classified as suspect, a stochastic selection algorithm may be used such that there is a P1 probability of going down a first path, a P2 probability of going down a second path, and a P3 probability of going down a third path, where the sum of P1, P2, and P3 is equal to one. If the IP address is classified as unknown, a stochastic selection process may be used to select a path from the three paths, where a different set of probabilities are assigned to the three paths than were assigned for the suspect classification. Similarly, if the IP address is classified as safe, a stochastic selection process may be used to select a path from the three paths, where a third set of probabilities are assigned to the three paths, distinct from those assigned for the suspect and unknown classifications. As an example selection process, each possible path from a node may be assigned an interval between zero and one, where the length of the intervals sum to one and each length corresponds to a probability of being selected (e.g., an interval with length 0.5 would have a 50% chance of being selected). A random number generator (e.g., a pseudo-random number generator) may be used to generate a number and the interval in which the number lies may be used to determine which path to take. Other ways of stochastically selecting paths may also be used.

Figure 11:
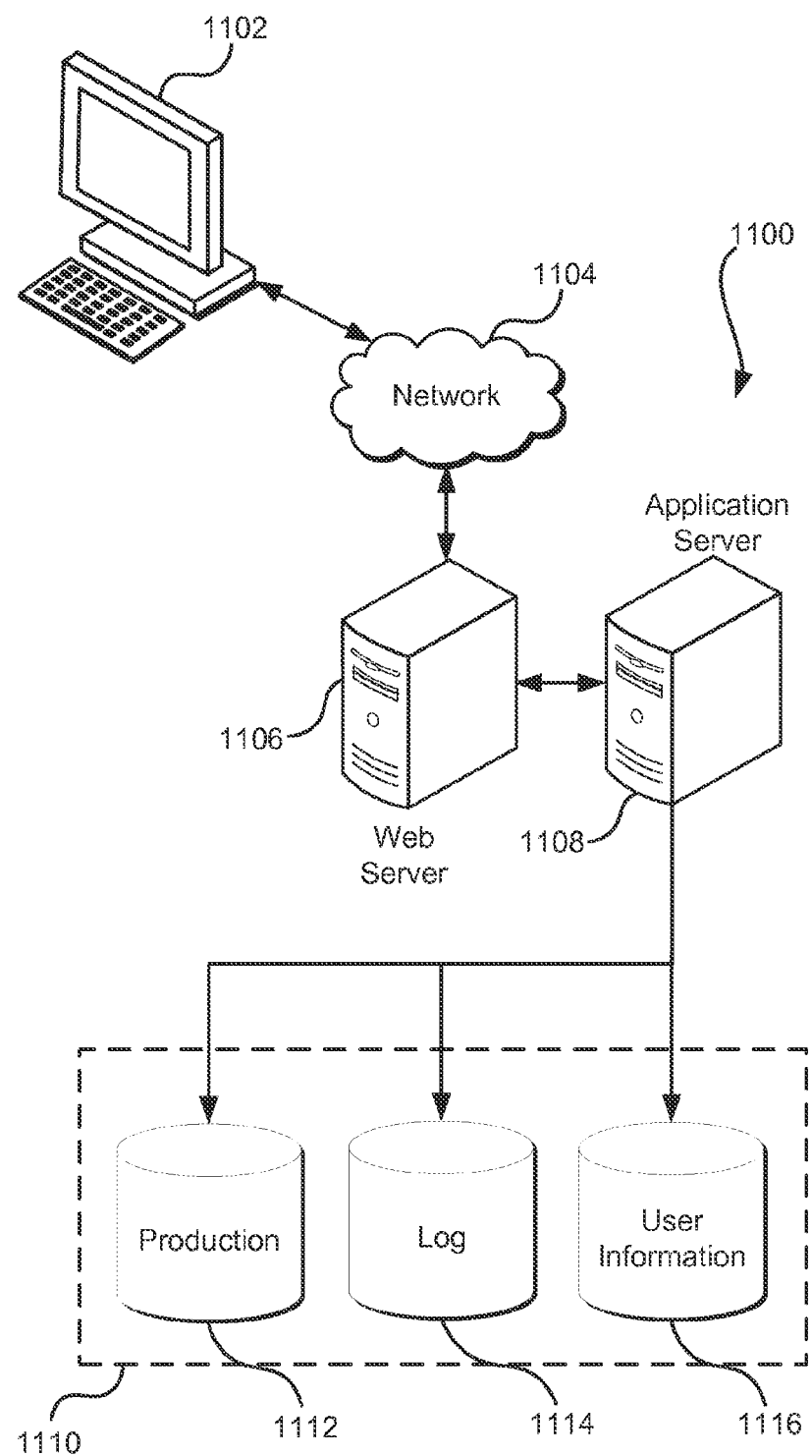
FIG. 11 shows an illustrative example of an environment in which various embodiments can be implemented.

FIG. 11 illustrates aspects of an example environment 1100 for implementing aspects in accordance with various embodiments. As will be appreciated, although a web-based environment is used for purposes of explanation, different environments may be used, as appropriate, to implement various embodiments. The environment includes an electronic client device 1102, which can include any appropriate device operable to send and/or receive requests, messages or information over an appropriate network 1104 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1106 for receiving requests and serving content in response thereto, although for other networks an alternative device serving a similar purpose could be used as would be apparent to one of ordinary skill in the art.

The illustrative environment includes at least one application server 1108 and a data store 1110. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 1102 and the application server 1108, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 1110 can include several separate data tables, databases, data documents, dynamic data storage schemes and/or other data storage mechanisms and media for storing data relating to a particular aspect of the present disclosure. For example, the data store illustrated may include mechanisms for storing production data 1112 and user information 1116, which can be used to serve content for the production side. The data store also is shown to include a mechanism for storing log data 1114, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. The application server 1108 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1102. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including,"

and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
   receiving, from a user client, a request to access a portion of a site provided by a computer-facilitated service, the request specifying identifying information of the user client;
   obtaining, from an activity log repository, information specifying prior activity associated with the user client;
   determining, based at least in part on the information specifying the prior activity associated with the user client and an automated agent score calculation computed using the information, whether to provide an interstitial user interface component configured to be successfully completable by an automated agent and to cause the user client to provide additional information about the user client, the interstitial user interface including a text input portion and a button to close the interstitial user interface that allows the user client to bypass the interstitial user interface by actuating the button to close the interstitial user interface having the text input portion and without input into the text input portion; and
   utilizing the additional information to determine whether the user client is using the automated agent to access the site.

2. The computer-implemented method of claim 1, wherein the method further includes, based at least in part on the automated agent score and for at least one type of computing resource usage, providing, to the user client a challenge, wherein successful completion of the challenge requires more computing resource usage of the type than servicing the request.

3. The computer-implemented method of claim 1, further comprising utilizing the information specifying the prior activity as input for a decision tree to determine whether to provide the interstitial user interface component.

4. The computer-implemented method of claim 1, wherein the information specifying the prior activity associated with the user client includes: an Internet Protocol address of the user client, a set of credentials utilized by the user client, and interactions with one or more sites provided by the computer-facilitated service.

5. A system, comprising at least one computing device that implements one or more services, wherein the one or more services:
   obtain information specifying prior activity associated with a client;
   determine, based at least in part on the obtained information, whether to provide an interstitial user interface component to cause the client to provide additional information about the client, the interstitial user interface component configured to be successfully completable by an automated agent, the interstitial user interface including a text input portion and a button to close the interstitial user interface by actuating the button to close the interstitial user interface and that allows the user client to bypass the interstitial user interface without input into the text input portion; and
   provide the interstitial user interface component.

6. The system of claim 5, wherein the one or more services are further configured to:
- receive, from a client and through the provided interstitial user interface component, the additional information about the client;
- store the additional information within an activity log repository;
- retrieve, from the activity log repository, the additional information; and
- utilize the additional information to determine whether the client is using the automated agent to access the portion of the site.

7. The system of claim 5, wherein the request to access the portion of the site includes identifying information of the client, the identifying information usable by the one or more services to locate the information specifying the prior activity associated with the client.

8. The system of claim 5, wherein the one or more services are further configured to:
- calculate, based at least in part on the obtained information, an automated agent score; and
- based at least in part on the calculated automated agent score, determine content for the interstitial user interface to be provided to the client.

9. The system of claim 5, wherein the one or more services are further configured to:
- utilize the obtained information as input for a decision tree; and
- based at least in part on a terminating node within the decision tree obtained through use of the obtained information, determine content for the interstitial user interface component to be provided to the client.

10. The system of claim 9, wherein the one or more services are further configured to use a probability distribution to determine how to proceed in the decision tree to reach the terminating node.

11. The system of claim 5, wherein the additional information about the client includes: a name of a user of the client, a mailing address of the user, payment information associated with the user, an electronic mail address for the user and at least one telephone number for the user.

12. The system of claim 5, wherein the interstitial user interface component is configured to obscure at least a portion of the portion of the site requested by the client to prevent client interaction with the portion of the site.

13. A non-transitory computer-readable storage medium having stored thereon executable instructions that, if executed by one or more processors of a computer system, cause the computer system to at least:
- access an activity log repository to obtain, based at least in part on a received request from a client to access a portion of a site, information specifying prior activity associated with the client;
- determine, based at least in part on the prior activity associated with the client, whether to present, to the client, an interstitial user interface component, the interstitial user interface component configured to cause the client to provide additional information about the client and to be successfully completable by an automated agent, the interstitial user interface including a text input portion and a button to close the interstitial user interface that allows the user client to bypass the interstitial user interface by actuating the button to close the interstitial user interface and without input into the input portion; and
- as a result of having received the additional information from the client, store the additional information within the activity log repository.

14. The non-transitory computer-readable storage medium of claim 13, wherein the information specifying the prior activity associated with the client includes: an Internet Protocol address of the client, a set of credentials utilized by the user client, cursor movements, button presses, keyboard key presses, modification of programming code for one or more sites, and interactions with the one or more sites.

15. The non-transitory computer-readable storage medium of claim 13, wherein the instructions further comprise instructions that, when executed by the one or more processors, cause the computer system to:
- calculate, based at least in part on the prior activity associated with the client, an automated agent score; and
- based at least in part on the calculated automated agent score, determine a configuration for the interstitial user interface to be provided to the client.

16. The non-transitory computer-readable storage medium of claim 13, wherein the received request to access the portion of the site includes identifying information usable to locate the information specifying the prior activity associated with the client.

17. The non-transitory computer-readable storage medium of claim 13, wherein the instructions further comprise instructions that, when executed by the one or more processors, cause the computer system to:
- utilize the prior activity associated with the client as input for a decision tree; and
- based at least in part on a terminating node within the decision tree obtained through use of the prior activity associated with the client, determine a configuration for the interstitial user interface to be provided to the client.

18. The non-transitory computer-readable storage medium of claim 17, wherein the instructions further comprise instructions that, when executed by the one or more processors, cause the computer system to use a probability distribution to select and follow one or more paths in the decision tree to reach the terminating node.

19. The non-transitory computer-readable storage medium of claim 13, wherein the instructions further comprise instructions that, when executed by the one or more processors, cause the computer system to:
- as a result of having received the additional information from the client, present one or more challenges to the client, the one or more challenges requiring the client to provide proof that the one or more challenges were completed;
- receive, from the client, the proof that the one or more challenges were completed; and
- verify, based at least in part on the provided proof, that the proof indicates successful completion of the one or more challenges.

20. The non-transitory computer-readable storage medium of claim 13, wherein the interstitial user interface component is configured to obscure at least a portion of the portion of the site requested by the client to prevent client interaction with the portion of the site.

* * * * *